（12） United States Patent
Jethmalani et al.

(10) Patent No.: US 7,371,804 B2
(45) Date of Patent: May 13, 2008

(54) MONOMERS AND POLYMERS FOR OPTICAL ELEMENTS

(75) Inventors: Jagdish Jethmalani, San Diego, CA (US); Andreas W. Dreher, Escondido, CA (US); Gomaa Abdel-Sadek, San Diego, CA (US); Jeffrey Chomyn, San Diego, CA (US); Jieming Li, Fullerton, CA (US); Maher Qaddoura, San Diego, CA (US)

(73) Assignee: Ophthonix, Inc., Vista, CA (US)

( * ) Notice: Subject to any disclaimer, the term of this patent is extended or adjusted under 35 U.S.C. 154(b) by 563 days.

(21) Appl. No.: 10/936,030

(22) Filed: Sep. 7, 2004

(65) Prior Publication Data

US 2006/0052547 A1    Mar. 9, 2006

(51) Int. Cl.
*C08F 12/04* (2006.01)
*C08F 112/08* (2006.01)
*C08F 28/02* (2006.01)

(52) U.S. Cl. ............... 526/286; 526/346; 359/290; 359/291; 359/292; 359/293; 525/528; 525/529; 525/522

(58) Field of Classification Search ........ 526/346, 526/224, 286; 359/290, 291, 292, 293; 525/528, 525/529, 522
See application file for complete search history.

(56) References Cited

U.S. PATENT DOCUMENTS

| | | |
|---|---|---|
| 5,236,970 A | 8/1993 | Christ et al. |
| 5,807,906 A | 9/1998 | Bonvallot et al. |
| 6,391,983 B1 * | 5/2002 | Bateman et al. ............ 525/529 |
| 6,450,642 B1 | 9/2002 | Jethmalani et al. |
| 6,712,466 B2 | 3/2004 | Dreher |
| 6,786,602 B2 | 9/2004 | Abitbol |
| 6,813,082 B2 | 11/2004 | Bruns |
| 6,840,619 B2 | 1/2005 | Dreher |
| 6,942,339 B2 | 9/2005 | Dreher |
| 6,989,938 B2 | 1/2006 | Bruns |
| 7,021,764 B2 | 4/2006 | Dreher |
| 2002/0080464 A1 | 6/2002 | Bruns |
| 2003/0143391 A1 * | 7/2003 | Lai ............................ 428/332 |
| 2004/0008319 A1 | 1/2004 | Lai et al. |

OTHER PUBLICATIONS

Jacobine, Anthony, "Radiation Curing Polymer Science and Technology," vol. 3, Ed. by J.P. Fouassier and J.F. Rabek, Elsevier Applied Science, pp. 219-268, Jul. 31, 1993.
U.S. Appl. No. 10/935,798, filed Sep. 7, 2004, entitled "Method of Manufacturing an Optical Lens".
U.S. Appl. No. 10/935,799, filed Sep. 7, 2004, entitled "Method for Stabilizing Refractive Index Profiles using Polymer Mixtures".
U.S. Appl. No. 10/848,942, filed May 18, 2004, entitled "Apparatus and Method for Curing of UV-Protected UV-Curable Monomer and Polymer Mixtures".

* cited by examiner

*Primary Examiner*—Ling-Sui Choi
(74) *Attorney, Agent, or Firm*—Morrison & Foerster LLP

(57) ABSTRACT

Compositions comprising a matrix polymer and a mixture of monomers are used for making polymer mixtures containing the matrix polymer and a second polymer formed from the monomer mixture. Preferably, the matrix polymer comprises a polyester, polystyrene, polyacrylate, thiol-cured epoxy polymer, thiol-cured isocyanate polymer, or mixtures thereof. Preferably, the monomer mixture comprises a thiol monomer and at least one second monomer selected from the group consisting of ene monomer and yne monomer. The compositions may be used to fabricate optical elements such as lenses.

10 Claims, 6 Drawing Sheets

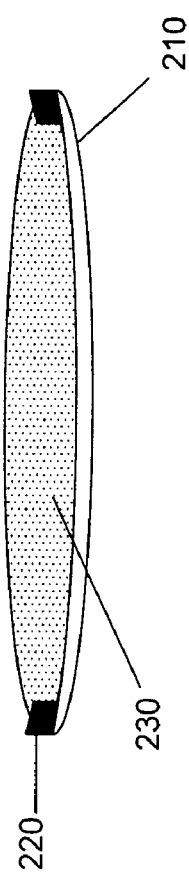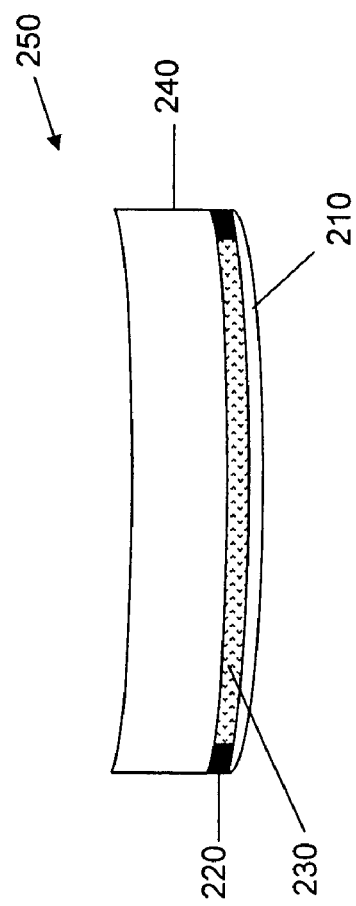

MONOMERS AND POLYMERS FOR OPTICAL ELEMENTS

BACKGROUND OF THE INVENTION

1. Field of the Invention

This invention relates to monomeric and polymeric materials, and to stabilized mixtures of monomeric and polymeric materials useful for making optical elements such as lenses.

2. Description of the Related Art

Optical elements such as eyeglass lenses are typically made by casting, grinding and/or polishing lens blanks made from glass or plastics such as polycarbonate, Finalite™ (Sola), MR-8 polymer (Mitsui), and diethylene glycol bis (allylcarbonate) polymer (CR-39) (PPG Industries). However, lenses made using these materials and fabrication techniques are only capable of correcting relatively simple optical distortions. Other fabrication techniques and polymer compositions have been developed to produce lenses that correct more complicated optical distortions. However, the commercialization of such lenses has been complicated by the relatively small number of suitable polymer compositions currently available. Polymer compositions such as those described in U.S. Pat. Nos. 5,236,970; 5,807,906; 6,391,983; and 6,450,642 are not entirely satisfactory. Hence, there is a need for polymer compositions suitable for the fabrication of optical elements, and particularly for optical elements capable of correcting complicated optical distortions.

SUMMARY OF THE INVENTION

A preferred embodiment provides a composition comprising: a matrix polymer having a monomer mixture dispersed therein, the matrix polymer being selected from the group consisting of polyester, polystyrene, polyacrylate, thiol-cured epoxy polymer, thiol-cured isocyanate polymer, and mixtures thereof; the monomer mixture comprising a thiol monomer and at least one second monomer selected from the group consisting of ene monomer and yne monomer. Another preferred embodiment provides a method for making such a composition comprising intermixing, in any order, the matrix polymer, the thiol monomer and the second monomer.

Another preferred embodiment provides a composition comprising a mixture that comprises a first polymer and a second polymer, the first polymer being selected from the group consisting of polyester, polystyrene, polyacrylate, thiol-cured epoxy polymer, thiol-cured isocyanate polymer, and mixtures thereof; the second polymer being selected from the group consisting of thiol-ene polymer and thiol-yne polymer; the mixture comprising at least one region in which the first polymer has a first degree of cure and the second polymer has a second degree of cure that may be different from the first degree of cure. Another preferred embodiment provides a method for making such a composition, comprising: providing a composition, the composition comprising a matrix polymer having a monomer mixture dispersed therein; the matrix polymer being selected from the group consisting of polyester, polystyrene, polyacrylate, thiol-cured epoxy polymer, thiol-cured isocyanate polymer, and mixtures thereof; the monomer mixture comprising a thiol monomer and a second monomer selected from the group consisting of ene monomer, yne monomer, and mixtures thereof; and polymerizing at least a portion of the monomer mixture to form the second polymer. Preferably, the polymerizing of the monomer mixture comprises irradiating the composition at ambient or elevated temperature.

Another preferred embodiment provides a compound of the formula

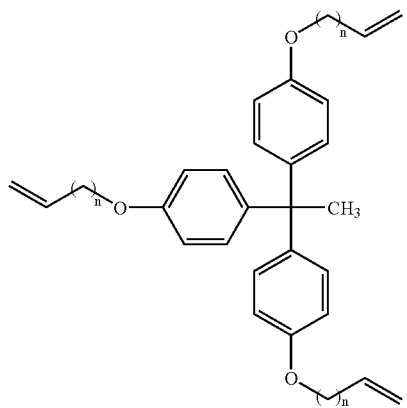

in which n is an integer in the range of about 1 to about 6.

Another preferred embodiment provides a kit comprising: a first container comprising a thiol monomer; and a second container comprising a matrix polymer selected from the group consisting of polyester, polystyrene, polyacrylate, epoxy polymer, isocyanate polymer, and mixtures thereof; and a second monomer selected from the group consisting of ene monomer and yne monomer.

Another preferred embodiment provides an optical element, comprising: a first lens; a cover; and a matrix polymer sandwiched between the first lens and the cover; the matrix polymer having a monomer mixture dispersed therein; the matrix polymer being selected from the group consisting of polyester, polystyrene, polyacrylate, thiol-cured epoxy polymer, thiol-cured isocyanate polymer, and mixtures thereof; and the monomer mixture comprising a thiol monomer and at least one second monomer selected from the group consisting of ene monomer and yne monomer. Preferably, the cover is a lens, plano or coating. More preferably, the first lens is a lens blank.

Another embodiment provides an optical element, comprising: a first lens; a cover; and a polymer mixture sandwiched between the first lens and the cover, the polymer mixture comprising a first polymer and a second polymer; the first polymer being selected from the group consisting of polyester, polystyrene, polyacrylate, thiol-cured epoxy polymer, thiol-cured isocyanate polymer, and mixtures thereof; the second polymer being selected from the group consisting of thiol-ene polymer and thiol-yne polymer; the polymer mixture comprising at least one region in which the first polymer has a first degree of cure and the second polymer has a second degree of cure that is different from the first degree of cure. Preferably, the cover is a second lens, plano or coating. More preferably, the first lens is a lens blank.

A polymerizable composition comprising:
  a first ene monomer and a first thiol monomer together having a first refractive index; and
  a second ene monomer and a second thiol monomer together having a second refractive index;
  wherein the first ene monomer is selected from the group consisting of styrene, divinylbenzene,

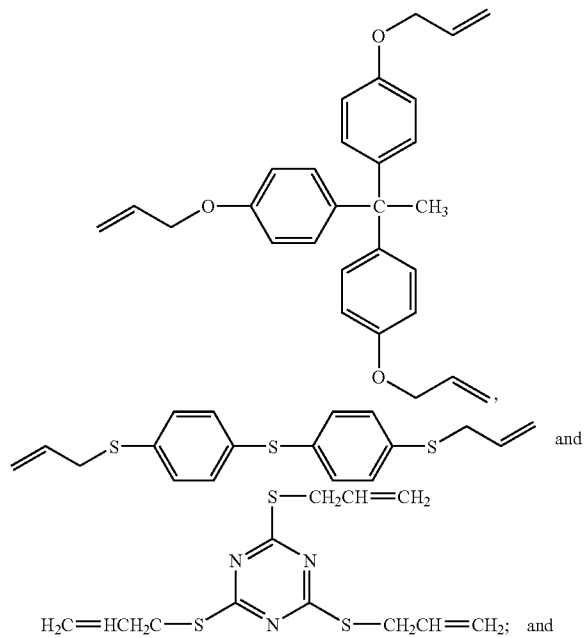

wherein the first thiol monomer is selected from the group consisting of thiobisbenezenethiol,

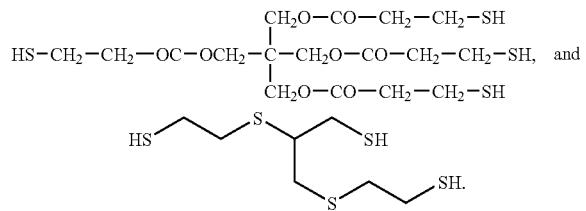

Another embodiment provides a kit comprising: a first container comprising a first monomer composition having a first refractive index, the first monomer composition comprising a first ene monomer and a first thiol monomer; and a second container comprising a second monomer composition having a second refractive index, the second monomer composition comprising a second ene monomer and a second thiol monomer; wherein the difference between the first refractive index and the second refractive index is in the range of about 0.001 to about 0.5.

Another embodiment is a method of stabilization of refractive index in the optical element in which the matrix polymer comprises an amount of a polymerization inhibitor that is effective to at least partially inhibit polymerization of the monomer mixture.

These and other embodiments are described in greater detail below.

BRIEF DESCRIPTION OF THE DRAWINGS

These and other aspects of the invention will be readily apparent from the following description and from the appended drawings (not to scale), which are meant to illustrate and not to limit the invention, and wherein:

FIGS. 2 and 3 are cross-sectional views schematically illustrating a preferred lens assembly process.

DETAILED DESCRIPTION OF THE PREFERRED EMBODIMENTS

Figure 1:
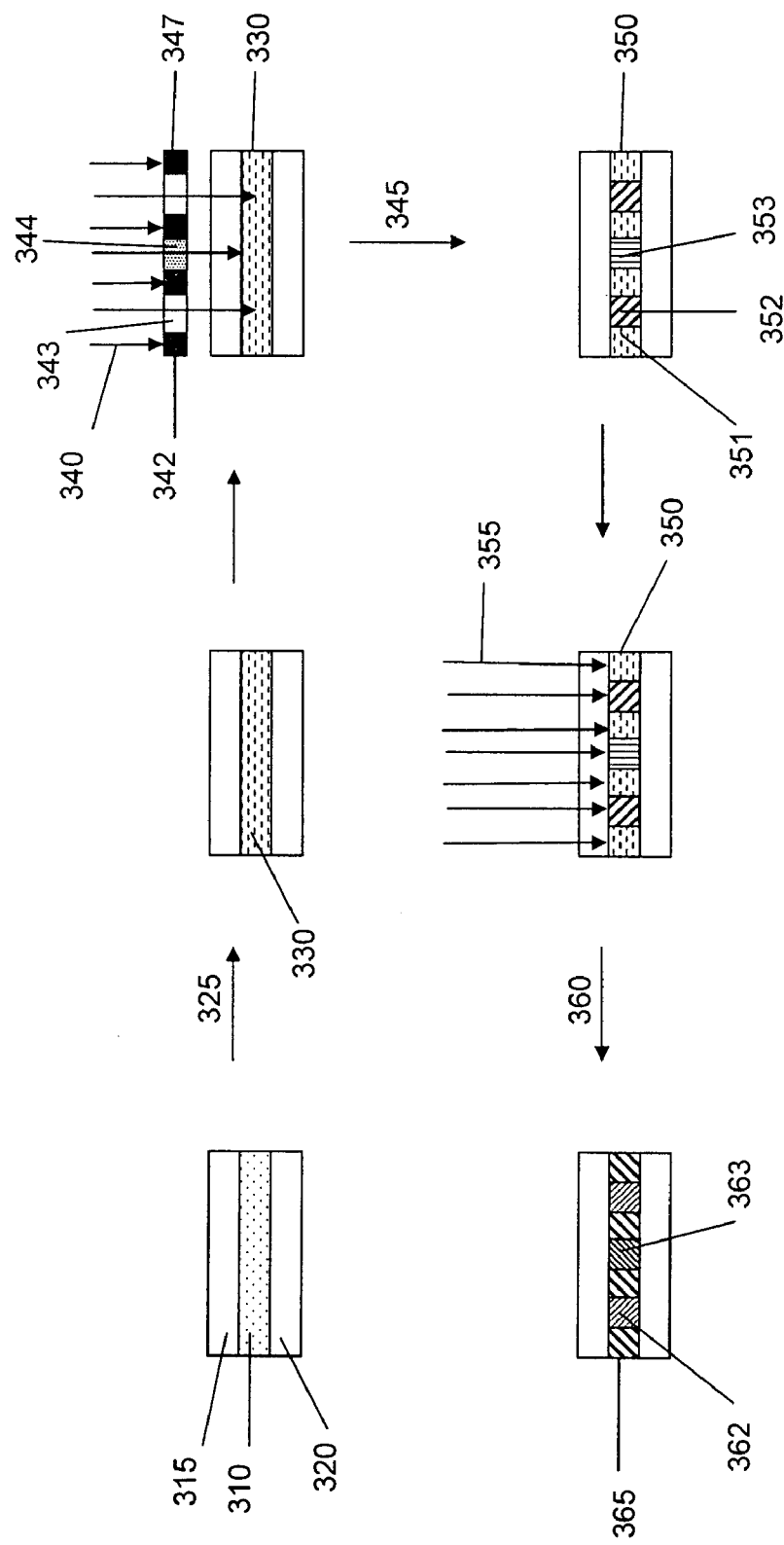
FIG. 1 is a cross-sectional view schematically illustrating a preferred process for making a polymer composition.

The term "polymer" is used herein in its usual sense and includes, e.g., relatively large molecules built up by linking together smaller molecules, natural and synthetic polymers, pre-polymers, oligomers, crosslinked polymers, blends, interpenetrating polymer networks, homopolymers, and copolymers (including without limitation block and graft copolymers). Likewise, the term "polymerization" is used herein in its usual sense and includes, e.g., a process of linking together smaller molecules to form polymers, crosslinking, oligomerization, and copolymerization. Polymerization includes photopolymerization (polymerization induced by irradiation) and thermal photopolymerization (polymerization induced by heat and irradiation).

The term "monomer" is used herein in its usual sense and includes, e.g., molecules that contain one or more polymerizable groups, including macromers. Monomers that contain more than one polymerizable group may be referred to herein as "multifunctional." A multifunctional monomer may be a crosslinker as described below. The terms "recurring unit" and "repeating unit" are used herein in their usual sense and include, e.g., the structures within the polymer that correspond to the linked-together monomers. The term "matrix polymer" refers herein to a polymer that is capable of functioning as a matrix, e.g., capable of including within its interstitial spaces various molecules such as, e.g., polymers and monomers. A matrix polymer may be crosslinked or non-crosslinked. A matrix polymer may possess free reactive groups such as acrylate, vinyl, allyl, methacrylate, epoxy, thiol, hydroxy, etc.

A "polyester" or "ester polymer" is a polymer that contains multiple ester recurring units and thus includes unsaturated polyesters. A "polystyrene" or "styrene polymer" is a polymer that contains multiple substituted and/or unsubstituted styrene recurring units and thus includes functionalized styrene polymers such as poly(allyloxystyrene). A "polyacrylate" or "acrylate polymer" is a polymer that contains multiple $-(CH_2-C(R^1)(CO_2R^2))-$ units, where $R^1$ represents hydrogen or $C_1$-$C_6$ alkyl, and $R^2$ represents hydrogen, $C_6$-$C_{12}$ aryl, $C_6$-$C_{12}$ halogenated aryl, $C_1$-$C_6$ alkyl or $C_1$-$C_6$ hydroxyalkyl. An epoxy polymer is a polymer that contains one or more epoxy groups. A "thiol-cured epoxy polymer" is a polymer formed by reacting a thiol-containing compound with an epoxy polymer. An isocyanate polymer is a polymer that contains one or more isocyanate groups. A "thiol-cured isocyanate polymer" is a polymer formed by reacting a thiol-containing compound with an isocyanate polymer. A "polyethyleneimine" is a polymer that contains ethylene recurring units and imine groups. An "unsaturated" polymer is a polymer containing one or more carbon-carbon double bonds.

An "ene" or "ene monomer" is a monomer that contains one or more carbon-carbon double bonds. A "thiol" or "thiol monomer" is a monomer that contains one or more sulfur-hydrogen bonds. A "thiol-ene polymer" is a polymer formed by the polymerization of an ene monomer and a thiol monomer. An "yne" or "yne monomer" is a monomer that contains one or more carbon-carbon triple bonds. A "thiol-yne polymer" is a polymer formed by the reaction of an yne monomer and a thiol monomer. A "crosslinking agent" is a compound that is capable of causing two monomers to be linked to one another, or a polymer molecule to be linked to another monomer or polymer molecule, typically by forming a crosslink. Crosslinking agents may be "crosslinkers", e.g., multifunctional compounds that become incorporated into the resulting crosslinked polymer, or may be "curing agents," e.g., catalysts or initiators that bring about reactions between the monomers, between the polymer molecules, between polymer molecules and crosslinkers, and/or between polymers and monomers to form the crosslinks. Curing agents typically do not become incorporated into the resulting crosslinked polymer. Thus, a crosslinking agent may be a crosslinker, a curing agent, or a mixture thereof. A crosslinked polymer may be optionally crosslinked to such an extent that it becomes infusible and/or insoluble. The terms "degree of crosslinking" and "degree of cure" refer to the extent of polymerization or crosslinking of a particular polymer, and can be expressed as a percentage of the difference in refractive index between the uncured (monomer) and fully cured versions of that polymer.

The term "mixture" is used herein in its usual sense to include various combinations of components, and thus includes polymer blends and interpenetrating networks (including semi-interpenetrating networks). A "blend" of polymers or "polymer blend" is an intimate mixture of two or more different polymers, e.g., a mixture of polymers that is phase separated on a microscopic scale. A "compatible blend" of polymers is a polymer blend that does not exhibit phase separation on a microscopic scale using visible light. An "interpenetrating polymer network" (IPN) is an intimate mixture of two or more polymers in which the polymers interpenetrate each other and entangle to some degree. An IPN is typically made by forming and/or crosslinking one polymer in the presence of monomers and/or another polymer.

The term "film" is used herein to refer to a material in a form having a thickness that is less than its height or width. A film typically has a thickness of about ten millimeters or less. A film may be free standing and/or may be hard-coated to enhance its mechanical stability, coated onto a surface or sandwiched between other materials. For example, a film may be formed while sandwiched between a substrate and a cover, or placed between a substrate and cover after being formed. The substrate and/or cover may be relatively non-stick materials such as polyethylene or fluorinated polymers that facilitate subsequent removal, or the substrate and/or cover may be materials (e.g., lens or lens blank) that are incorporated into the final product, e.g., an optical element. A composition is considered "substantially transparent to optical radiation" if it is suitable for use in an optical element such as a lens, mirror or prism. Thus, such a composition may be colored or tinted to a degree, e.g., in the general manner of sunglasses or tinted contact lenses, and still be considered "substantially transparent to optical radiation."

The foregoing definitions and examples mentioned therein are non-limiting and not mutually exclusive. Thus, for example, a compatible polymer blend may be an IPN and vice versa.

A preferred embodiment is a composition that comprises a matrix polymer and a monomer mixture dispersed therein. The matrix polymer is preferably selected from the group consisting of polyester, polystyrene, polyacrylate, thiol-cured epoxy polymer, thiol-cured isocyanate polymer, and mixtures thereof. The matrix polymer may be obtained commercially or made by methods known to those skilled in the art. Preferred matrix polymers contain (or are prepared from polymers that contain) reactive groups (e.g., double bonds and/or epoxy groups) that facilitate crosslinking. Preferably, the matrix polymer is unsaturated (e.g., contains double bonds) and/or contains epoxy groups and/or contains isocyanate groups. Crosslinking may be accomplished chemically (e.g., by reacting the matrix polymer with a crosslinker such as a thiol, preferably in the presence of a curing agent such as an amine, tin compound, phosphate compound, or mixtures thereof) or photochemically (e.g., by exposure to visible or ultraviolet radiation), optionally with heating. The amount of crosslinking agent used to crosslink the polymer is preferably selected based on the desired degree of cure and respective curing characteristics of the matrix polymer and crosslinking agent in a manner generally well known to those skilled in the art.

In a preferred embodiment, the matrix polymer is the product of a chemical reaction between a crosslinking agent and an unsaturated polyester, unsaturated polystyrene, unsaturated polyacrylate, or mixture thereof. An example of a preferred unsaturated polyester is represented by the formula (I) in which n is an integer in the range of from about 2 to about 5000, preferably from about 2 to about 100.

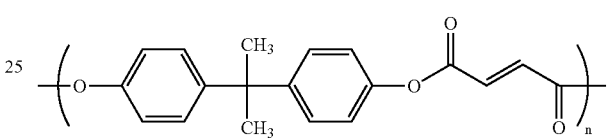

(I)

Unsaturated polyesters encompassed by the formula (I) are available commercially (e.g., ATLAC 382-E from Reichhold) or may be prepared by methods known to those skilled in the art (e.g., from bisphenol A and maleic anhydride). The unsaturated polyester of the formula (I) is preferably crosslinked by intermixing with a thiol, more preferably in the presence of an amine, optionally with heating. This invention is not bound by theory, but it is believed that the thiol undergoes Michael addition with the fumaric acid recurring unit to bring about crosslinking of the unsaturated polyester. Examples of preferred amines useful for crosslinking unsaturated polymers include polyethyleneimine and tetraalkyl ammonium halide. See Anthony Jacobine, "Radiation Curing Polymer Science and Technology," Vol. 3, Ed. by J. P. Fouassier and J. F. Rabek, Elsevier Applied Science, pp. 219-268.

An example of a preferred unsaturated polystyrene is a poly(allyloxystyrene), preferably as represented by the formula (II) in which n is an integer in the range of from about 2 to about 5000, preferably from about 2 to about 100.

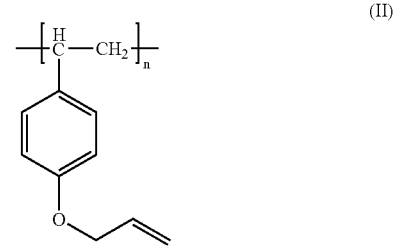

(II)

The unsaturated polystyrene of the formula (II) is available commercially or may be prepared by methods known to those skilled in the art. Unsaturated polystyrenes are preferably crosslinked by exposure to visible or ultraviolet radiation, optionally with heating. This invention is not bound by theory, but it is believed that the unsaturated groups (e.g., allyloxy groups) in the presence of a suitable curing agent (e.g., an initiator) react with one another or with thiols to bring about crosslinking of the unsaturated polystyrene.

In a preferred embodiment, the matrix polymer is an epoxy polymer, an isocyanate polymer, or a mixture thereof, more preferably a thiol-cured epoxy polymer, thiol-cured isocyanate polymer, or mixture thereof. An example of a preferred epoxy polymer is represented by the formula (III) in which n is an integer in the range of from about 2 to about 5000, preferably from about 2 to about 100.

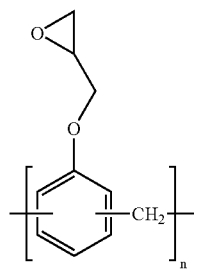

(III)

The epoxy polymer of the formula (III) is available commercially or may be prepared by methods known to those skilled in the art. A wide variety of epoxy polymers may be prepared by the reaction of epoxy monomers with comonomers (e.g., amines, alcohols, carboxylic acids and/or thiols) in a manner generally known to those skilled in the art. Examples of preferred epoxy monomers and polymers include those represented by the following structures in which n is an integer in the range of from about 2 to about 5000, preferably from about 2 to about 100:

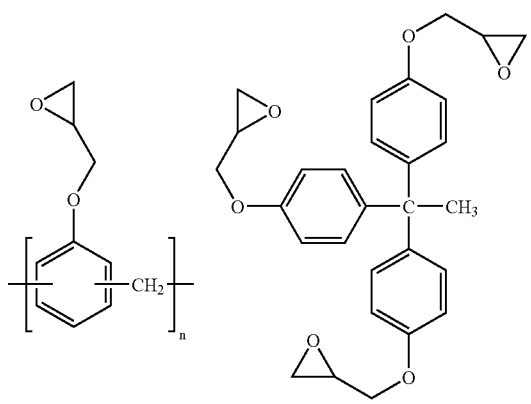

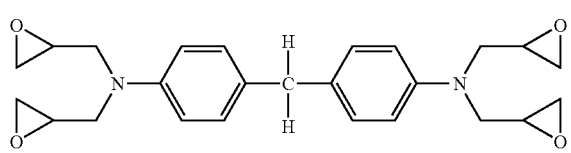

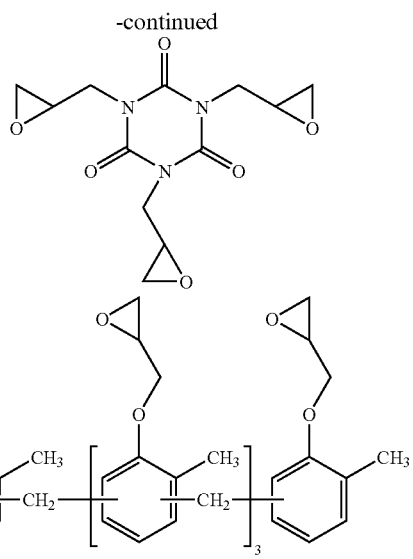

Epoxy polymers are preferably crosslinked by intermixing with a thiol monomer (crosslinker) and an amine curing agent, optionally with heating. Thiol-cured epoxy polymers are preferred.

An example of a preferred isocyanate polymer is represented by the formula (IV), wherein each X is individually selected from the group consisting of O, NH and S; wherein $R_1$ and $R_2$ are each individually selected from the group consisting of $C_2$-$C_{18}$ aliphatic and $C_6$ to $C_{18}$ aromatic; and wherein m is an integer in the range of from about 1 to about 5000, preferably from about 1 to about 100.

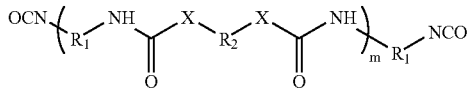

(IV)

The isocyanate polymer of the formula (IV) is available commercially or may be prepared by methods known to those skilled in the art. Examples of preferred commercially available isocyanate polymers include Desmodur 3300AR3600 (homopolymer of hexamethylene diisocyanate, CAS 28182-81-2, available from Bayer). A wide variety of isocyanate polymers may be prepared by the reaction of isocyanate monomers with comonomers (e.g., alcohols, amines and/or thiols) in a manner generally known to those skilled in the art. Examples of preferred commercially available isocyanate monomers (Mondur, from Bayer) include those represented by the following structures:

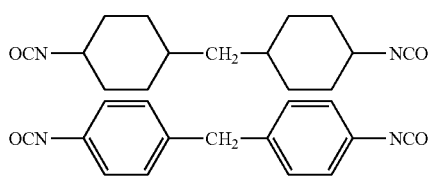

-continued

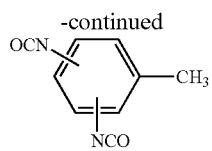

Isocyanate polymers are preferably crosslinked by intermixing with a crosslinking agent (e.g., thiol, amine, alcohol, tin compound, and/or phosphate compound), optionally with heating. Thiol-cured isocyanate polymers are preferred. Preferably, the thiol crosslinker is a thiol monomer as described elsewhere herein.

The monomer mixture dispersed within the matrix polymer preferably comprises monomers that undergo step-growth polymerization, more preferably comprises monomers that undergo radiation-initiated step growth polymerization. For example, a preferred monomer mixture comprises a thiol monomer and at least one second monomer. The second monomer is preferably an ene monomer, an yne monomer, or a mixture thereof, more preferably a multifunctional ene monomer. The thiol monomer is preferably a multifunctional thiol monomer. Non-limiting examples of preferred thiol monomers include those represented by the following structures:

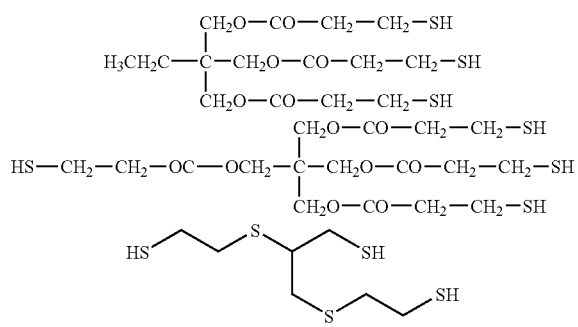

The structures of additional examples of preferred thiol monomers are shown in Table 1, in which n, m, x, y, and z are each individually in the range of about 2 to about 5000, preferably 2 to 100. A wide variety of thiol monomers may be purchased commercially or prepared by methods known to those skilled in the art.

The second monomer is preferably an ene monomer, an yne monomer, or a mixture thereof. The second monomer is preferably a multifunctional monomer. Non-limiting examples of preferred ene monomers include those represented by the following structures:

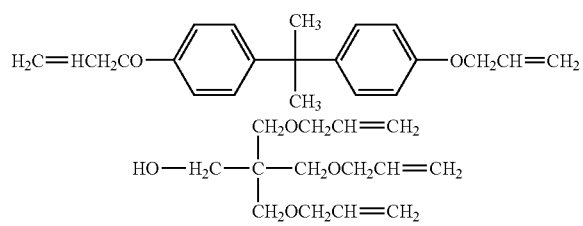

The structures of additional examples of preferred second monomers are shown in Table 2, in which n, m, x, y, and z are each individually in the range of about 2 to about 5000, preferably from about 2 to about 100. A particularly preferred type of ene monomer is represented by structure (V), in which n is an integer, preferably in the range of about 1 to about 6. A preferred method for preparing the ene monomer represented by the structure (V) in which n=1 is described in the Examples below.

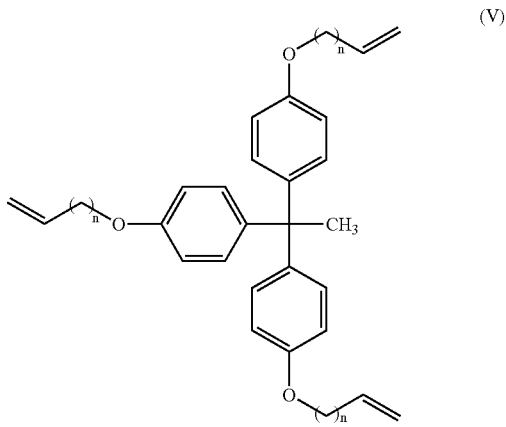

Polymer compositions that comprise a matrix polymer and a monomer mixture dispersed therein preferably further comprise a curing agent (preferably a photoinitiator) and optionally one or more additives such as a polymerization inhibitor, antioxidant, photochromic dye, and/or UV-absorber. Such additives are commercially available. Photoinitiators may be present in the polymer composition as the residue of a prior photoinitiated polymerization (e.g., for the preparation of the matrix polymer) or may be included for other purposes, preferably for initiating polymerization of the monomer mixture. The amount and type of photoinitiator are preferably selected to produce the desired polymer, using selection criteria generally known to those skilled in the art. The compound 1-hydroxy-cyclohexyl-phenyl-ketone (available commercially from Ciba under the tradename Irgacure 184™) is an example of a preferred photoinitiator. Other preferred photoinitiators include benzoin, Irgacure 500™ (50% 1-hydroxy-cyclohexyl-phenyl-ketone+50% benzophenone), Irgacure 651™ (2,2-dimethoxy-1,2-diphenylethan-1-one), Irgacure 819™ (bis(2,4,6-trimethylbenzoyl)-phenylphosphineoxide), and Irgacure 2959™ (1-[4-(2-Hydroxyethoxy)-phenyl]-2-hydroxy-2-methyl-1-propane-1-one). Examples of preferred polymerization inhibitors include N-PAL (N-nitroso N-phenylhydroxylaamine aluminium salt) and MEHQ (4-methoxyphenol). Examples of preferred UV-absorbers include Tinuvin 327 (2,4-di-tert-butyl-6-(5-chlorobenzotriazol-2-yl) phenol), and Tinuvin 144 (bis(1,2,2,6,6-Pentamethyl-4-piperidinyl) (3,5-di-(tert)-butyl-4-hydroxybenzyl)butylpropanedioate). Examples of preferred antioxidants include TTIC (tris(3,5-di-tert-butyl-4-hydroxybenzyl) isocyanurate), and IRGANOX 1010 (tetrakis-(methylene-(3,5-di-terbutyl-4-hydrocinnamate)methane). Examples of photochromic dyes include spiro-naphthoxazines and naphthopyrans (e.g., Reversacol dyes from James Robinson, UK) and those disclosed in PCT WO 02091030, which is hereby incorporated by reference and particularly for the purpose of describing photochromic dyes.

Polymer compositions that comprise a matrix polymer and a monomer mixture dispersed therein may be prepared by intermixing, in any order, the matrix polymer, the thiol monomer and the second monomer. Preferably, intermixing is conducted by forming and/or crosslinking the matrix polymer in the presence of the thiol monomer and second monomer. For example, in a preferred embodiment, an unsaturated polyester matrix polymer is intermixed with a photoinitiator, a thiol monomer, an ene monomer, and optionally a crosslinking agent (e.g., an amine) to form a composition comprising an unsaturated polyester matrix polymer and a monomer mixture (thiol and ene) dispersed therein. In another embodiment, that composition is heated and/or irradiated to at least partially crosslink the unsaturated polyester, thereby forming a composition comprising a thiol-cured polyester, a remaining thiol monomer and the ene monomer. Preferably, the amount of remaining thiol monomer is sufficient to react with the ene monomer. It will be understood by those skilled in the art that a portion of the ene monomer may also react with pendant thiol groups tethered on unsaturated polyester and become part of the thiol-cured polyester. In an additional embodiment, discussed below, either of these compositions (each comprising a matrix polymer and a monomer mixture dispersed therein) is irradiated to at least partially polymerize the thiol and ene monomers to form a thiol-ene polymer, thereby forming a mixture comprised of the matrix polymer (e.g., polyester) and the thiol-ene polymer. The relative amounts of ene and thiol monomers in the polymerizable composition are preferably such that the number of ene functional groups is about equal to the number of thiol functional groups.

FIG. 1 schematically illustrates a preferred process for making a polymer composition that comprises a matrix polymer and a monomer mixture dispersed therein. In the illustrated embodiment, the matrix polymer is a polyester and the monomer mixture comprises a thiol monomer and an ene monomer. It will be understood that other matrix polymers and monomers may be used in the process described herein in connection with FIG. 1, including those described herein. In addition, variations of the preferred process may be practiced, using the knowledge of one skilled in the art in light of the teachings provided herein.

The composition 310 illustrated in FIG. 1 contains 13 parts of an unsaturated polyester represented by the formula (I), 10 parts of an ene monomer (pentaerythritol triallyl ether), 21 parts of a thiol monomer (trimethylolpropane tri(3-mercaptoproprionate)), 1.1 parts of an amine (polyethyleneimine), and 0.075 parts of a photoinitiator Irgacure 184™ (all parts herein are by weight, unless otherwise stated). The composition 310 is degassed under vacuum and sandwiched between a glass cover 315 and a glass substrate 320, then crosslinked by heating 325 for about 40 minutes at a temperature of about 65° C. to 75° C. Longer or shorter periods of heating may be employed for crosslinking other polymers. The heating 325 results in the crosslinking of the unsaturated polyester with the thiol in the composition 310, thereby forming a composition 330 that contains a thiol-cured polyester having free thiol groups, the ene monomer, the remaining thiol monomer, the photoinitiator, and (typically) a small amount of residual amine (e.g., amine not consumed by crosslinking). It is understood that small amounts of the ene monomer, thiol monomer, and/or photoinitiator may be consumed (e.g., incorporated into the crosslinked polyester in the composition 330) during the crosslinking.

The glass cover 315 and substrate 320 allow the composition 330 to be prepared in the form of a uniform film having a controlled thickness. For example, spacers may be optionally placed between the plates to form a film having a desired thickness. One or both of the cover 315 and substrate 320 may be flat or curved plates that may be used to form a film having a desired topology. Preferably, the covers are substantially transparent to optical radiation. Examples of suitable cover and substrate materials include optically transparent materials having a refractive index in the range of about 1.5 to about 1.74, such as glass and plastic, preferably polycarbonate, Finalite™ (Sola), MR-8 polymer (Mitsui), and diethylene glycol bis(allylcarbonate) polymer (CR-39) (PPG Industries). The cover may be a protective coating. Preferably, one or both of the covers is a lens, plano lens, or lens blank.

It is also understood that the glass cover 315 and substrate 320 are optional. For example, the composition 310 may be cast onto a substrate and crosslinked to form a free-standing film, e.g., a film having sufficient mechanical strength to allow it to be peeled from the substrate, without using a cover. Preferably, the physical form of the composition 330 is a gel, e.g., a gel in film form. To facilitate peeling the filmy gel from the surface, it is preferable to treat the surface of the substrate with a release agent prior to applying the composition 310, and/or to use a hard coated UV-clear CR-39 substrate. The peeled film may be hard coated to enhance its mechanical stability.

Polymer compositions that comprise a matrix polymer and a monomer mixture dispersed therein may be used to make compositions that comprise a first polymer and a second polymer, the second polymer being formed by polymerization of the monomer mixture. For example, as illustrated in FIG. 1, the composition 330, sandwiched between the glass cover 315 and substrate 320, is exposed to radiation 340 (preferably with heating), thereby activating the photoinitiator and polymerizing 345 the monomers dispersed within the composition 330 to form a thiol-ene polymer in the presence of the crosslinked polyester. A photomask 347 is used to control the amount of radiation received at different points in the composition 330. The photomask 347 may comprise regions 342 that are essentially opaque to the radiation, regions 343 that are essentially transparent to the radiation, and regions such as the region 344 that transmit a portion of the radiation. The resulting composition 350 thus contains the crosslinked polyester, the thiol-ene polymer (e.g., in regions 352, 353 exposed to the radiation 340), the partially polymerized thiol-ene (e.g., in region 352, exposed to the radiation 340) and (in some cases) largely unpolymerized thiol monomer and ene monomer (e.g., in regions 351 not exposed to radiation 340).

It will be understood that the degree of cure of the thiol-ene polymer in any particular region will be related to the amount of radiation transmitted by the photomask 347 to that particular region. Thus, the degree of cure of the thiol-ene polymer may be controlled by the photomask, allowing various patterns of cure to be written into the composition 350. For example, in the embodiment illustrated in FIG. 1, the cure pattern in the composition 350 results from the varying degrees of cure in the regions 351, 352, 353. Additional regions of the photomask with additional variations in their transmissibility may be used. It will be understood that a relatively simple cure pattern is shown in FIG. 1 for the purposes of illustration, and that much more complex cure patterns may be obtained. For example, a complex pattern may be created in a photomask using well known photolithographic techniques, and that photomask may be used to create a correspondingly complex cure pattern in the polymer composition. Other digital mask systems such as Digital Light Projector (DLP) along with a UV-light source or UV-Vertical Cavity Surface Emitting Laser (UV-VSCEL) or laser (e.g., triple YAG) or bundled UV-LED may be used.

Preferably, composition 350 is a polymer blend, more preferably an IPN or compatible blend. The polymerization of the monomers in the composition 330 may be in one or multiple stages, e.g., by exposure to a single dose of radiation or multiple doses. Likewise, the monomers in the various regions 351, 352, 353 of the composition 350 may be polymerized to the same degree or different degrees, and/or at the same or different times. Thus, for example, the photomask 347 may be used as illustrated in FIG. 1 to simultaneously irradiate various regions of the composition 330 to produce a composition in which the thiol-ene polymer is polymerized to varying degrees in the various regions 351, 352, 353. The same or similar effect may be achieved by sequentially irradiating various regions, e.g., by varying the intensity of a scanning light source (e.g., a laser) across the composition 330. Additional monomer(s) may be added at any stage of the process. For example, monomer(s) may be diffused into the composition 330 and/or the composition 350, then later polymerized, as illustrated in Example 16 below.

The crosslinking of the matrix polymer and the polymerization of the monomers may be conducted simultaneously or sequentially (in either order), preferably sequentially, and the degree of polymerization or crosslinking of each polymer may be controlled independently, so as to be different (or the same) from place to place within the composition. Preferably, the matrix polymer is crosslinked prior to polymerization of the monomers. For example, the composition 350 illustrated in FIG. 1 contains a crosslinked polyester in which the degree of crosslinking is substantially constant throughout the composition, and a thiol-ene polymer having degrees of polymerization in the various regions 351, 352, 353 that are different from each other.

In many end-use applications, e.g., lenses, it may be undesirable for the composition 350 to contain slightly polymerized or unpolymerized materials. In a preferred embodiment, the monomers in a substantial portion of the regions are at least partially polymerized, thereby advantageously reducing the residual monomer content and increasing the stability of the composition. For example, in FIG. 1 the entire composition 350 is exposed to radiation 355, thereby at least partially polymerizing the thiol and ene monomers 360 throughout the composition 350 to produce the polymer composition 365. Preferably, the degree of cure (polymerization) of the thiol and ene monomers is controlled so that the cure pattern previously written into the composition 350 is largely preserved. Such control may be exercised by, e.g., exposing the composition 350 to radiation in a manner that increases the degree of cure of the entire composition 350 by approximately the same amount. For example, if a region 352 of the composition 350 has been previously cured to a degree of cure of about 60% and another region 353 has been cured to a degree of cure of about 20%, the difference in degree of cure between the two regions 352, 353 is about 40%. This difference in degree of cure may be largely preserved (and thus the difference in physical properties, e.g., refractive index, may be largely preserved) by exposing both regions 352, 353 to an amount of radiation that increases the degree of cure to 70% and 30% in the resulting two regions 362, 363, respectively.

For compositions comprising a mixture that contains a first polymer and a second polymer (e.g., the compositions 350, 365), the relative amounts of first and second polymer are preferably in the range of about 0.01:9.99 to about 9.99:0.01, more preferably about 3:7 to about 7:3, by weight. The relative amounts of first and second polymer may be controlled by making the precursor composition (e.g., the composition 330) with the corresponding amounts of matrix polymer and monomers, and/or adding additional monomers and/or polymers during the process of making the desired composition.

Those skilled in the art, in light of the teachings provided herein, will understand that the physical properties of the first and second polymers may each be independently controlled, both temporally and spatially. Thus, for example, a preferred embodiment provides a composition comprising a mixture that comprises a first polymer and a second polymer, in which the mixture comprises at least one region in which the first polymer has a first degree of cure and the second polymer has a second degree of cure that is different from the first degree of cure. For example, in FIG. 1, the degree of cure of the first polymer (crosslinked polyester matrix) in the region 353 of the composition 350 may be the same as the degree of cure of the second polymer (thiol-ene polymer) in that region, but preferably the degrees of cure are different. In addition, the composition preferably comprises a second region in which the two degrees of cure are also different, both from each other and, optionally, from the degrees of cure in the first region. For example, in the composition 350, the degree of cure of the thiol-ene polymer in the region 353 is different than the degree of cure of the crosslinked polyester matrix in the region 353, and different from the degree of cure of the thiol-ene polymer in the region 352. In a preferred embodiment, the first degree of cure is in the range of about 50% to about 100%, and/or the second degree of cure is in the range of about 1% to about 100%, based on the difference in refractive index between the uncured and cured first polymer as described below. More preferably, the first polymer is selected from the group consisting of polyester, polystyrene, polyacrylate, thiol-cured epoxy polymer, thiol-cured isocyanate polymer, and mixtures thereof, and/or the second polymer is selected from the group consisting of thiol-ene polymer and thiol-yne polymer.

Preferably, the differences in degree of cure in various regions of the composition result in differences in optical properties. Thus, measurement of an optical property often provides a convenient way to express the degree of cure. Refractive index measurements have been found to be particularly convenient for this purpose, because the refractive index of a monomer or monomer mixture is generally different from the corresponding polymer formed from that monomer or monomer mixture. Therefore, the degree of cure can be expressed in percentage terms, based on the difference in refractive index between the uncured and cured polymer. For example, a hypothetical monomer has a refractive index of 1.5 and the polymer formed from that monomer has a refractive index of 1.6. The degree of cure of a partially polymerized composition formed from that monomer would be considered 10% for a refractive index of 1.51, 40% for a refractive index of 1.54, 80% for a refractive index of 1.58, etc. Another method to determine the degree of cure is to measure the optical path difference (OPD) by Zygo Interferometry.

Compositions described herein (comprising a first matrix polymer and a monomer mixture or comprising a first polymer and a second polymer) preferably have a refractive index in the range of about 1.5 to about 1.74. For compositions having two or more refractive indices (e.g., compositions in which the refractive index varies from place to place within the composition), a composition is considered to have a refractive index in the range of about 1.5 to about 1.74 if any one of the various refractive indices is in the range of about 1.5 to about 1.74. Compositions having two or more regions of refractive indices may be prepared by controlling the degree of cure at various points within the composition using, e.g., a photomask, digital mask (DLP) or scanning laser as discussed above. Preferably, the photomask permits various degrees of cure between full cure and no cure, e.g., transmits various amounts of radiation as a function of position within the photomask, thereby controlling the intensity of transmitted radiation (and degree of cure) in any particular region of the composition. Likewise, a scanning laser may be used to selectively cure the polymer in a first region of the composition to the extent desired in that first region, then scanned to a second region to selectively cure the polymer in the second region to a degree that is the same or different (as desired) than the degree of cure in the first region, then scanned to a third region to selectively cure the polymer in the third region to a degree that is the same or different (as desired) than the degree of cure in the first and/or second regions, etc.

It has been found that the stability of compositions containing multiple regions having differing degrees of cure may be influenced by various factors, including gravity (e.g., dense regions tend to sink), diffusion (e.g., monomers tend to diffuse faster than higher molecular weight components) and polymerization (e.g., slow thermal polymerization of monomers and/or partially cured regions at ambient temperature). In preferred embodiments, one or more such stability issues are addressed, and compositions having improved stability are provided, e.g., as demonstrated in the examples below. Preferred compositions comprise a polymerization inhibitor that is present in an amount effective to at least partially inhibit polymerization of monomers and/or partially cured regions of the composition.

In some cases the procurement of various monomers, polymers and/or additives useful for making an optical element may be inconvenient and/or costly. A preferred embodiment is directed to a kit that comprises at least one container and one or more of the components used to make the compositions described herein. For example, a preferred kit comprises at least one container, a matrix polymer, a thiol monomer, and a second monomer. Preferably, the matrix polymer is a polyester, a polystyrene, a polyacrylate, an epoxy polymer, an isocyanate polymer, or a mixture thereof. Preferably, the second monomer is an ene monomer, yne monomer or mixture thereof. In a preferred embodiment, a first container comprises a thiol monomer, and a second container comprises a second monomer (more preferably, selected from the group consisting of ene monomer and yne monomer) and a matrix polymer (more preferably, selected from the group consisting of polyester, polystyrene, polyacrylate, epoxy polymer, isocyanate polymer, and mixtures thereof). Preferred kits further comprise one or more additives selected from the group consisting of photoinitiator, polymerization inhibitor, antioxidant, photochromic dye, and/or UV-absorber. Preferably, at least one material selected from the group consisting of the matrix polymer, the thiol monomer and the second monomer, has a refractive index in the range of about 1.5 to about 1.74. More preferably, the matrix polymer, the thiol monomer and the second monomer each have a refractive index in the range of about 1.5 to about 1.74.

The compositions described herein may be used in a number of applications. For example, preferred compositions are substantially transparent to optical radiation, and thus are useful as optical elements, e.g., eyeglass lenses, intraocular lenses, contact lenses, and lenses used in various pieces of optical equipment. The methods described herein enable the production of optical elements in which the index of refraction at any particular point within the element can be controlled. Such optical elements are useful in, for example, the production of optical elements that correct higher-order aberrations of the human eye, see, e.g., U.S. Pat. No. 6,712,466, and co-pending U.S. application Ser. No. (entitled "Method of Manufacturing an Optical Lens"), filed Sep. 7, 2004, both of which are hereby incorporated by reference in their entireties.

Additional preferred embodiments provide polymerizable compositions useful for making optical elements. These polymerizable compositions are particularly useful for fabricating optical elements using the methods described in U.S. patent application Ser. No. 10/253,956, published as U.S. Patent Application Publication No. 2004-0008319 A1, both of which are hereby incorporated by reference in their entireties. U.S. patent application Publication No. 2004-0008319 A1 ("the '8319 publication") discloses, inter alia, techniques for making optical elements using micro-jet printing methods to precisely control the type, position and amount of polymer deposited onto a substrate. In preferred embodiments, the proportions of two or more different polymer compositions are varied over the course of the deposition process to deposit adjoining polymer pixels in the form of a film on the substrate surface. The optical properties of each adjoining polymer pixel can be selected to provide a predetermined optical property, including a specific value of index of refraction. Preferably, the film has a radially non-monotonic refractive index profile and/or an angularly non-monotonic refractive index profile.

As described in the '8319 publication, preferred methods for making optical elements involve the projection of two or more polymer compositions onto pre-selected locations on a substrate. The term "polymer composition," as used in the '8319 publication, is a broad term that refers to a composition that comprises a polymer, and the term "polymer" includes all forms of polymer and their precursors, including polymerizable compositions such as pre-polymers.

Polymerizable compositions have now been discovered that are particularly well-suited for use in the methods described in the '8319 publication, although they are useful for other applications as well. Preferred polymerizable compositions comprise a first ene monomer and a first thiol monomer together having a first refractive index; and a second ene monomer and a second thiol monomer together having a second refractive index; the difference between the first refractive index and the second refractive index being in the range of about 0.001 to about 0.5, preferably in the range of about 0.001 to about 0.1. The monomers may be intermixed in any order to form the polymerizable composition. The polymerizable compositions are preferably made by preparing a high index composition comprising the first ene monomer and a first thiol monomer; preparing a low index composition comprising second ene monomer and a second thiol monomer, and may involve intermixing the high index composition and the low index composition to form the polymerizable composition. The refractive indices of each of the monomer pairs (e.g., the first refractive index of the first ene monomer and the first thiol monomer together) are measured apart from the polymerizable composition. To determine the refractive index of the ene monomer and thiol monomer apart from the polymerizable composition, a test sample is prepared which contains the ene monomer and thiol monomer together in the same relative proportions as in the polymerizable composition. The refractive index of the test sample is then determined at 25° C. Those skilled in the art will recognize that various mixtures of the components are themselves polymerizable compositions. For example, the first ene monomer and a first thiol monomer together form a polymerizable composition, and likewise the second ene monomer and the second thiol monomer together form a second polymerizable composition.

The high index composition and the low index composition are preferably intermixed by the methods described in the '8319 publication. For example, FIG. 1A of the '8319 publication illustrates a preferred embodiment in which two polymer compositions are projected onto a substrate using a spray unit 100 that is controlled by a computerized controller 105, the spray unit 100 comprising a first spray head 110 and a second spray head 115 (reference numbers refer to those used in the '8319 publication). Preferably, the first spray head 110 contains or is charged with a high index composition, and the second spray head 115 contains or is charged with a low index composition. Intermixing of the high and low index compositions to form a polymerizable composition may then be conducted as described in the '8319 publication, e.g., by projecting a first polymer droplet from the first spray head 110 onto a pre-selected location on the substrate 120 to form a first deposited polymer droplet 125, projecting a second polymer droplet 130 from the second spray head 115 in close proximity to the first deposited polymer droplet 125, and forming a first polymer pixel 135 by mixing the first deposited polymer droplet 125 and the second polymer droplet 130. Thus, in this embodiment, the first polymer pixel 135 comprises the polymerizable composition formed from the high index composition (comprising the first ene monomer and the first thiol monomer together having a first refractive index, as measured apart from the polymerizable composition) and the low index composition (comprising the second ene monomer and the second thiol monomer together having a second refractive index, as measured apart from the polymerizable composition). Preferably, the difference between the first refractive index and the second refractive index is in the range of about 0.001 to about 0.5, preferably in the range of about 0.001 to about 0.1. The polymerizable compositions may also be formed or used by other methods described in the '8319 publication.

The refractive index of the polymerizable composition may be varied over a broad range by varying the relative amounts of the high index composition and the low index composition, and by appropriate selection of the ene and thiol monomers themselves. The ratio of high index composition to low index composition in the polymerizable composition may vary over a broad range of from about 0:100 to about 100:0. Preferably, the ratio is selected by considering the refractive index of the individual components, using routine experimentation to confirm that the resulting mixture provides the desired refractive index after polymerization. Preferably, the relative amounts of ene and thiol monomers are selected such that subsequent polymerization forms a polymer having the desired physical properties, e.g., mechanical and optical properties. More preferably, the relative amounts of ene and thiol monomers in the polymerizable composition are such that the number of ene functional groups is about equal to the number of thiol groups.

A wide variety of ene and thiol monomers are useful for making polymerizable compositions. The thiol and ene and yne monomers shown in Tables 1 and 2 are preferred. The refractive indices of preferred high and low index compositions are described in the Examples below. The refractive indices of other high and low index compositions may be determined by routine experimentation. In any particular polymerizable composition, the first ene monomer may be the same as the second ene monomer, or the first thiol monomer may be the same as the second thiol monomer, so long as the first ene monomer and the first thiol monomer together have a first refractive index, as measured apart from the polymerizable composition, and the second ene monomer and the second thiol monomer together have a second refractive index, also as measured apart from the polymerizable composition, such that the difference between the first refractive index and the second refractive index is in the range of about 0.001 to about 0.5, more preferably in the range of about 0.001 to about 0.1. Preferably, the first ene monomer is selected from the group consisting of styrene, divinylbenzene,

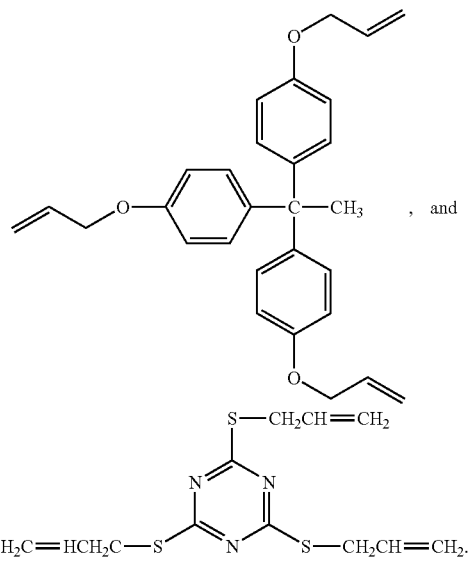

Preferably, the first thiol monomer and the second thiol monomer in the polymerizable composition are selected from the group consisting of thiobisbenezenethiol,

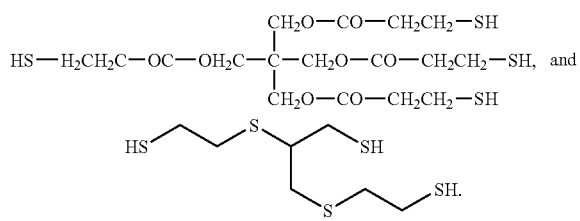

Preferably, the second ene monomer is:

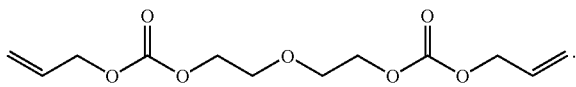

The polymerizable composition may further comprise one or more additives such as solvents, surfactants, crosslinking agents, polymerization inhibitors, polymerization initiators, colorants, flow control agents, and/or stabilizers. Preferably, the polymerizable composition comprises one or more additives selected from the group consisting of polymerization initiator (e.g., photoinitiator, thermal initiator), polymerization inhibitor, antioxidant, photochromic dye, and UV-absorber.

In preferred embodiments the components of the polymerizable composition are provided in the form of a kit. A preferred kit comprises a first container comprising a high index composition having a first refractive index, the high index composition comprising a first ene monomer and a first thiol monomer; and a second container comprising a low index composition having a second refractive index, the low index composition comprising a second ene monomer and a second thiol monomer, the difference between the first refractive index and the second refractive index preferably being in the range of about 0.001 to about 0.5, more preferably in the range of about 0.001 to about 0.1. Thiol and ene monomers useful in the kit are described above. The containers may further comprise one or more additives such as crosslinking agents, polymerization inhibitors, polymerization initiators, colorants, flow control agents, and/or stabilizers as described above. The size, shape and configuration of the containers may be varied as needed to provide a convenient source of the components. For example, the kit may be in the form of a cartridge adapted for use in a polymer projection deposition system as described in the '8319 publication.

TABLE 1

| No. | Thiol Monomers |
|---|---|
| 1 | 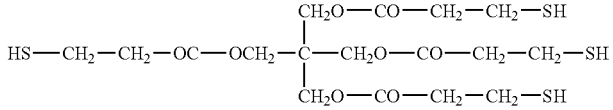 |
| 2 | 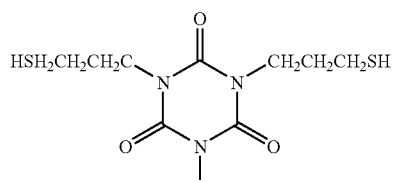 |
| 3 | 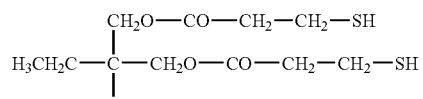 |
| 4 | 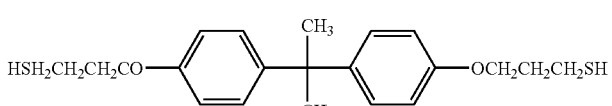 |
| 5 | 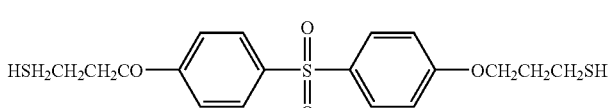 |
| 6 | 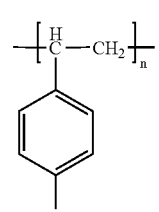 |

TABLE 1-continued
| No. | Thiol Monomers |
|---|---|
| 7 | 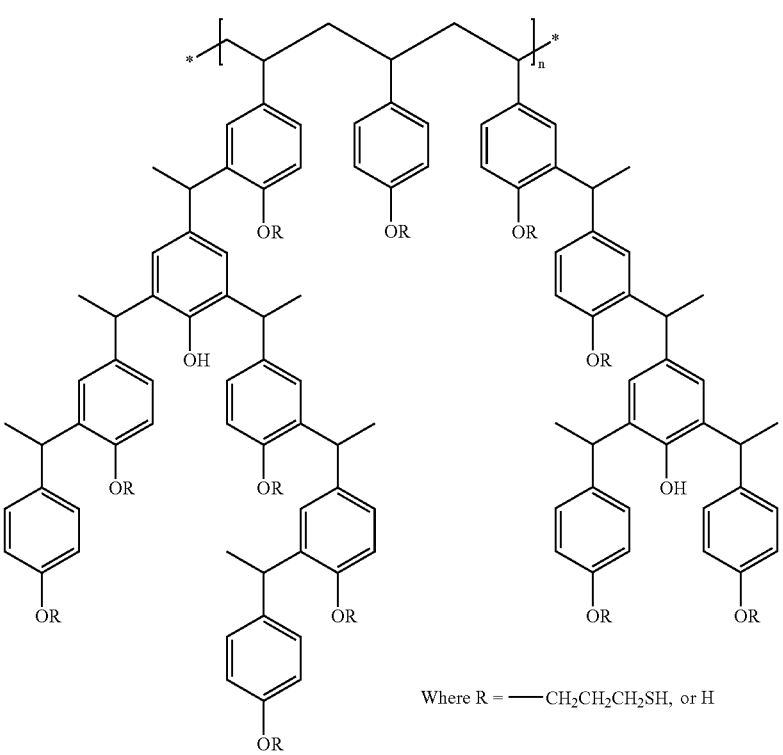 Where R = —CH₂CH₂CH₂SH, or H |
| 8 | 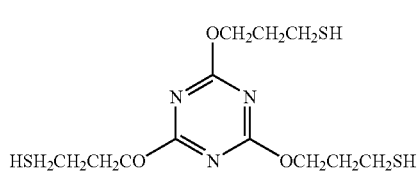 |
| 9 | 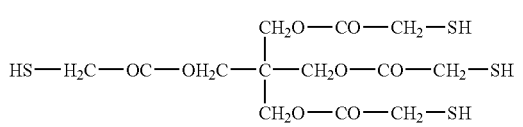 |
| 10 | 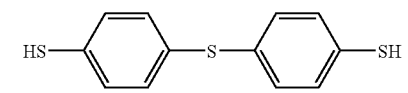 |
| 11 | 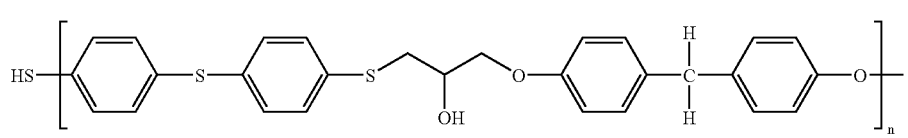 |
| 12 | 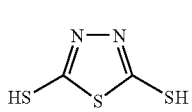 |
| 13 | 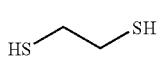 |
| 14 | 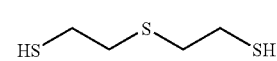 |

TABLE 1-continued

| No. | Thiol Monomers |
|---|---|
| 15 | HS–CH₂CH₂–S–CH(CH₂SH)–CH₂–S–CH₂CH₂–SH (structure) |
| 16 | Trimethylbenzene with three –CH₂–S–CH₂CH₂–SH substituents (structure) |

TABLE 2

| No. | Ene and Yne Monomers |
|---|---|
| 1 | H₂C=HCH₂CO–C₆H₄–C(CH₃)₂–C₆H₄–OCH₂CH=CH₂ |
| 2 | H₂C=HCH₂CO–C₆H₄–SO₂–C₆H₄–OCH₂CH=CH₂ |
| 3 | Poly(4-(vinyloxymethyl)styrene) structure |
| 4 | Poly(bromo-(vinyloxymethyl)styrene) structure |
| 5 | Triallyl isocyanurate (H₂C=CHCH₂-N in triazine-2,4,6-trione with three allyl groups) |

TABLE 2-continued

| No. | Ene and Yne Monomers |
|---|---|
| 6 | 2,4,6-tris(allyloxy)-1,3,5-triazine derivative with OCH$_2$CH=CH$_2$, OCH$_2$CH=CH$_2$, and OCH$_2$CH=CH$_3$ substituents |
| 7 | Bis(allyl) ester of hexachloro-bicyclic dicarboxylic acid (chlorendic acid diallyl ester) |
| 8 | Terpolymer: [-(H$_2$C-CH(1,3-dioxane with propyl))-]$_x$[-(CH$_2$-CH-O-CH$_2$-CH=CH$_2$)-]$_y$[-(CH$_2$-CH-O-C(=O)-CH$_3$)-]$_z$ |
| 9 | Melamine-based oligomer with vinyl amide groups; Where R = CH$_3$, C$_4$H$_9$, or H |
| 10 | 1,2,4-trivinylcyclohexane |
| 11 | H$_2$C=(H$_3$C)COC(OH$_2$CH$_2$C)$_2$O—[bisphenol A]—O(CH$_2$CH$_2$O)$_2$COC(CH$_3$)=CH$_2$ |
| 12 | H$_2$C=(H$_3$C)CCO$_2$H$_2$C(HO)HCH$_2$CO—[bisphenol A]—OCH$_2$CH(OH)CH$_2$O$_2$CC(CH$_3$)=CH$_2$ |
| 13 | Triallyl trimellitate |

TABLE 2-continued

| No. | Ene and Yne Monomers |
|---|---|
| 14 | $CH_2\!=\!CHCH_2O_2COCH_2CH_2OCH_2CH_2OCO_2CH_2CH\!=\!CH_2$ |
| 15 | 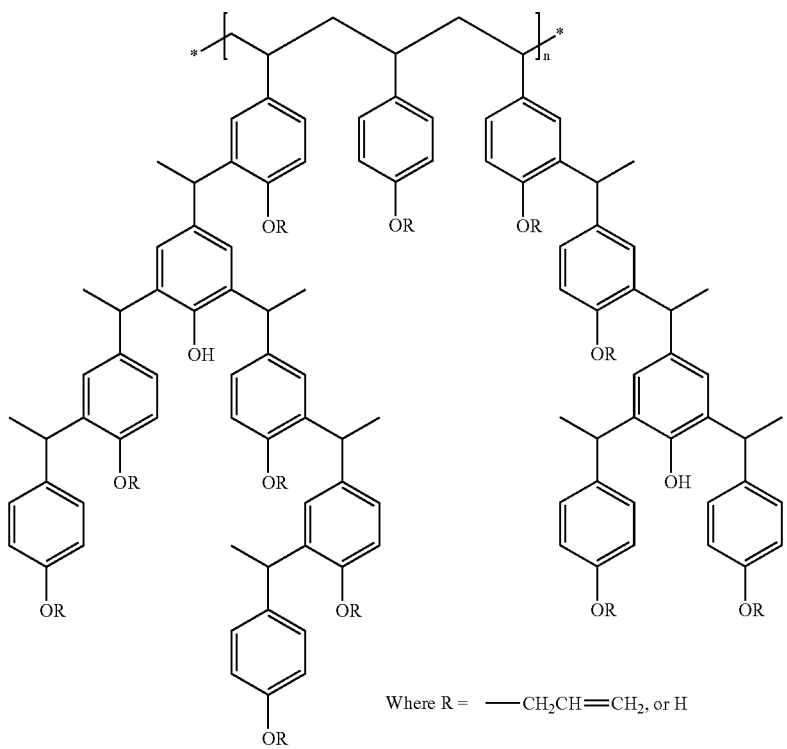 Where R = —$CH_2CH\!=\!CH_2$, or H |
| 16 | 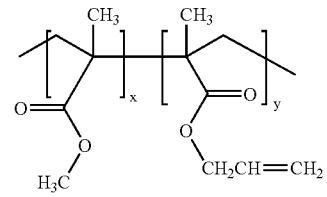 |
| 17 | $\begin{array}{c} \phantom{HO-H_2C-}CH_2OCH_2CH\!=\!CH_2 \\ HO\!-\!H_2C\!-\!C\!-\!CH_2OCH_2CH\!=\!CH_2 \\ \phantom{HO-H_2C-}CH_2OCH_2CH\!=\!CH_2 \end{array}$ |
| 18 | $\begin{array}{c} \phantom{HO-H_2C-}CH_2O\!-\!CO\!-\!CH\!=\!CH_2 \\ HO\!-\!H_2C\!-\!C\!-\!CH_2O\!-\!CO\!-\!(CH_2)_{16}\!-\!CH_3 \\ \phantom{HO-H_2C-}CH_2O\!-\!CO\!-\!CH\!=\!CH_2 \end{array}$ |
| 19 | 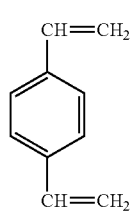 |

TABLE 2-continued
| No. | Ene and Yne Monomers |
|---|---|
| 20 | 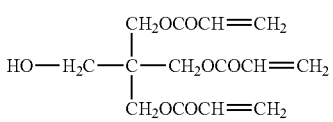 |
| 21 | 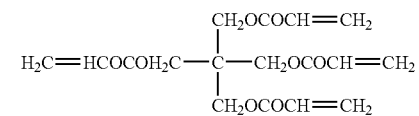 |
| 22 | 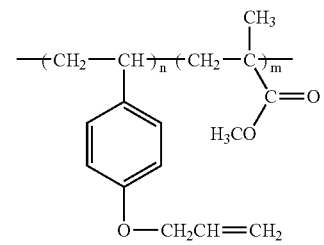 |
| 23 | 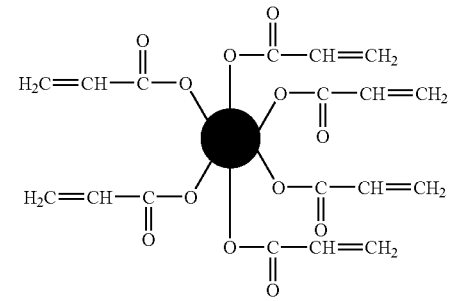<br>Hexafunctional urethane acrylate ester(aliphatic), CN975<br>(from SARTOMER, circle represents proprietary core structure) |
| 24 | 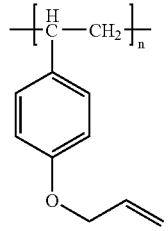 |
| 25 | 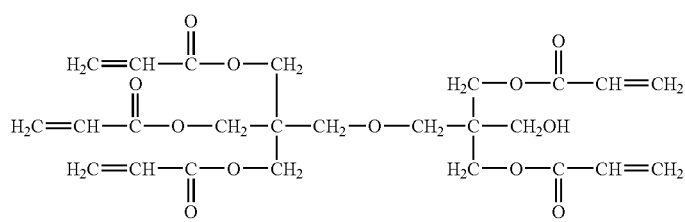 |

TABLE 2-continued

| No. | Ene and Yne Monomers |
|---|---|

26

$$HO-H_2C-\underset{\underset{CH_2OCOCH=CH_2}{|}}{\overset{\overset{CH_2OCOCH=CH_2}{|}}{C}}-CH_2OCOCH=CH_2$$

$+$ $$H_2C=HCOCOH_2C-\underset{\underset{CH_2OCOCH=CH_2}{|}}{\overset{\overset{CH_2OCOCH=CH_2}{|}}{C}}-CH_2OCOCH=CH_2$$

27

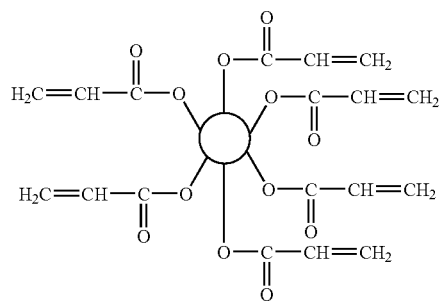

Ebecryl 1290 (Aliphatic urethane hexaacrylate)
(from UCB Chemicals, circle represents proprietary core structure)

28

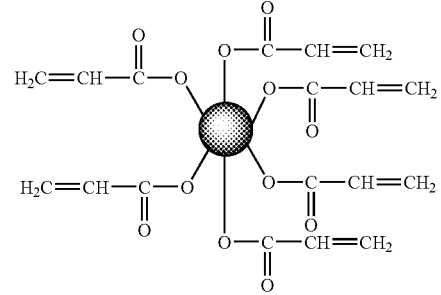

Ebecryl 220 (Aromatic urethane hexaacrylate)
(from UCB Chemicals, circle represents proprietary core structure)

29

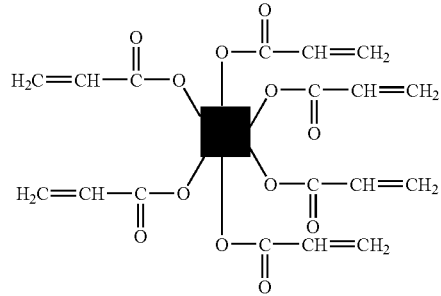

Ebecryl 830 (Polyester hexaacrylate)
(from UCB Chemicals, square represents proprietary core structure)

TABLE 2-continued
| No. | Ene and Yne Monomers |
|---|---|
| 30 | 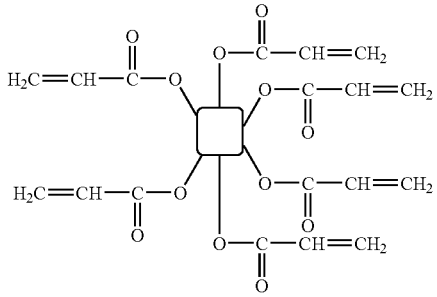<br>Ebecryl 8301 (Aliphatic urethane hexaacrylate)<br>(from UCB Chemicals, square represents proprietary core structure) |
| 31 | 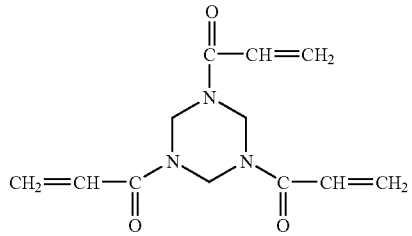 |
| 32 | 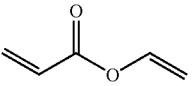 |
| 33 | 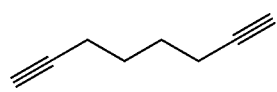 |
| 34 | 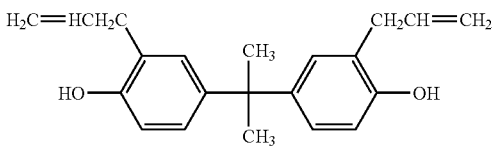 |
| 35 | 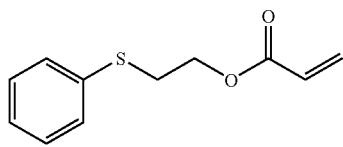 |
| 36 | 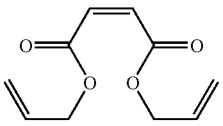 |
| 37 | 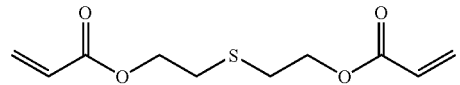 |
| 38 | 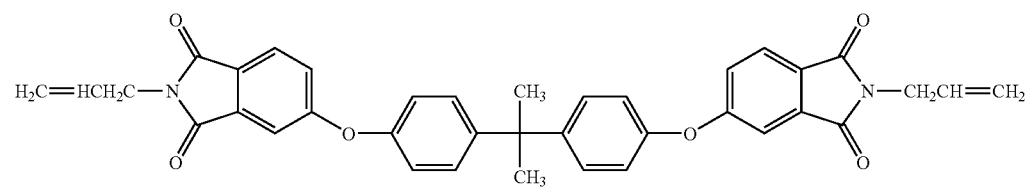 |

TABLE 2-continued

| No. | Ene and Yne Monomers |
|---|---|
| 39 | (structure: bis(methallyl) carbonate) |
| 40 | (copolymer structure with styrene, N-allyl acrylamide, methacrylic acid, α-methylstyrene units) |
| 41 | (bisphenol A fumarate polymer) |
| 42 | (4,4′-bis(allylthio)diphenyl sulfide) |
| 43 | (2,4,6-tris(allylthio)-1,3,5-triazine) |
| 44 | (1,1,1-tris(4-allyloxyphenyl)ethane) |
| 45 | (pentabromophenyl methacrylate) |
| 46 | (2,4,6-tris(propargylthio)-1,3,5-triazine) |

TABLE 2-continued
| No. | Ene and Yne Monomers |
|---|---|
| 47 | 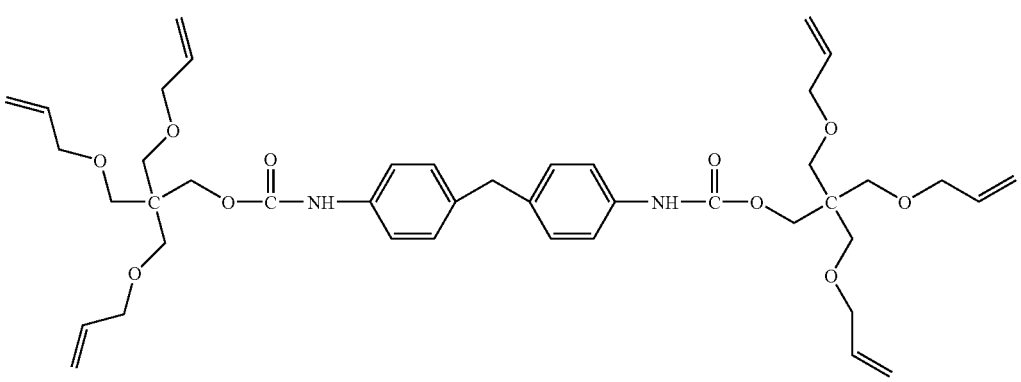 |
| 48 | 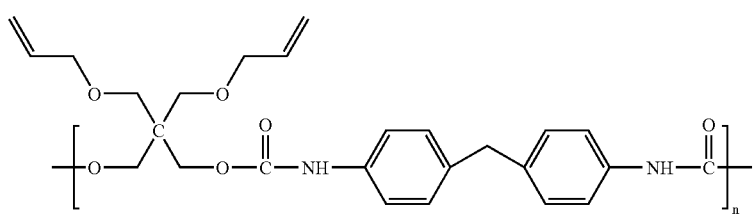 |
| 49 | 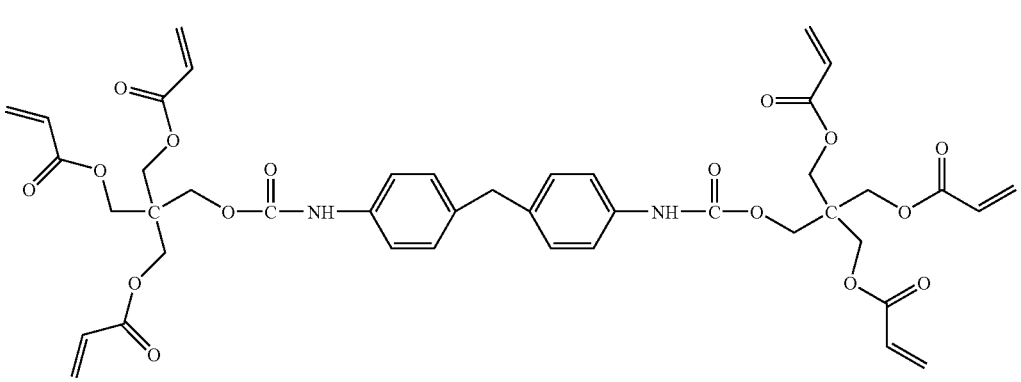<br>+<br>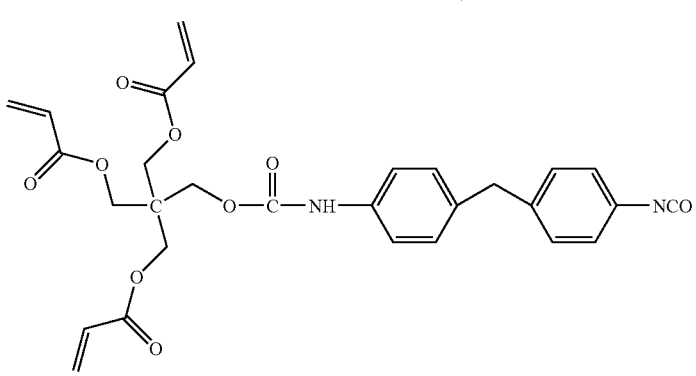 |

TABLE 2-continued
| No. | Ene and Yne Monomers |
|---|---|
| 50 | 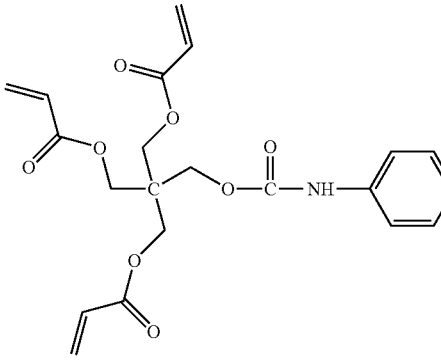 |
| 51 | 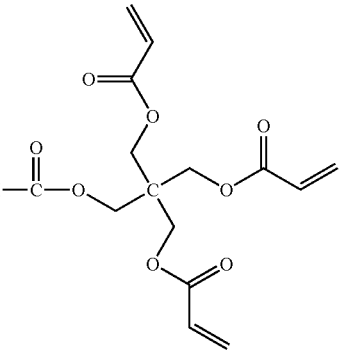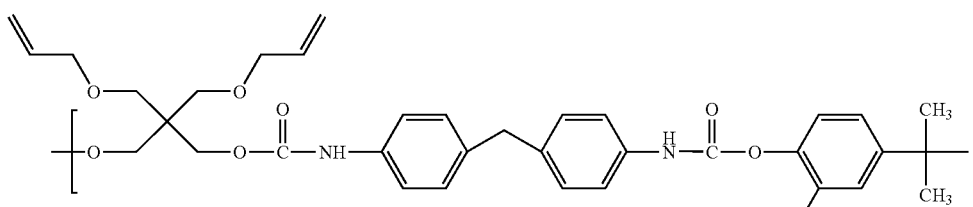 |
| 52 | 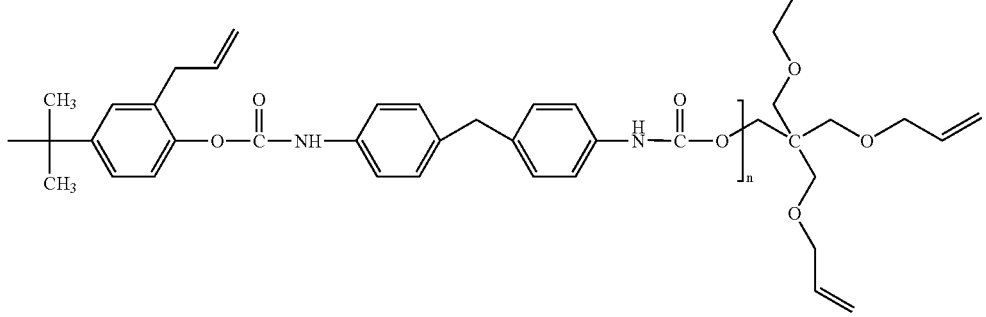 |

TABLE 2-continued

| No. | Ene and Yne Monomers |
|---|---|
| 53 | 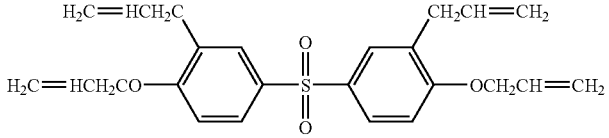 |
| 54 | 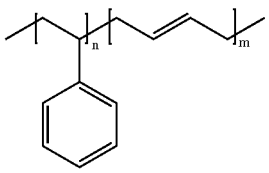 |

EXAMPLES

Materials: Starting materials were commercially available. Pentaerythritol triallyl ether (70% triallyl) (ene monomer) and trimethylolpropane tris(3-mercaptopropionate) (thiol monomer) were obtained from Aldrich. Copolymer of Bisphenol A and fumaric acid (ATLAC 382-E, (unsaturated polyester) was obtained from Reichhold. The amine (1838-L 3M Scotch Weld (Part A)) was obtained from R. S. Hughes. Irgacure 184™ (photoinitiator) was obtained from Ciba. N-PAL (polymerization inhibitor) was obtained from Albemarle. ATLAC was dissolved in acetone, filtered through a 2.5 µ filter and stored in acetone and used as the acetone solution of ATLAC. Poly[(phenyl glycidyl ether)-co-formaldehyde], an epoxy polymer represented by the formula (m), and polyethyleneimine were purchased from Aldrich. Diallylether Bisphenol A was obtained from Bimax. Tetrabutyl ammonium bromide was obtained from Aldrich. Acetone, HPLC grade, was obtained from Fisher Scientific.

Example 1

A kit having Parts I and II was made as follows:

Part 1: In a labeled 100 mL bottle, 6.000 g of pentaerythritol triallyl ether (70% triallyl), 13.000 g of trimethylolpropane tris(3-mercaptopropionate), 13.000 g of ATLAC (previously dissolved in acetone, filtered through a 2.5µ filter, and dried), 0.0088 g N-PAL and 0.044 g of Irgacure 184™ were weighed. Using a stirrer bar and a magnetic stirrer, the ingredients was stirred for about 10 minutes to give a homogenous mixture. The mixture was rotary evaporated at 50° C. for 1-2 hours to evaporate all acetone.

Part II: In another labeled 30 mL amber vial, 4.000 g of pentaerythritol triallyl ether (70% triallyl), 8.000 g of trimethylolpropane tris(3-mercaptopropionate), and 0.528 g of amine (1838-L 3M Scotch Weld (Part A)) were weighed. Using a stirrer bar and a magnetic stirrer, the formulation was stirred for about 10 minutes to give a homogenous mixture.

Example 2

A portion of Parts I and II (from the kit of Example 1) were mixed in a ratio of 2.53:1, respectively. The Part I composition was weighed carefully in a 100 mL beaker. Based on the amount of Part I formulation, the calculated amount of Part II was added into the same beaker. The two compositions were first mixed thoroughly by hand using a glass stirrer (glass was found to work better than metal), followed by mixing using a magnetic stirrer to form a mixture, then used immediately as described in Example 3.

Example 3

The mixture of Example 2 was transferred to a glass plate equipped with a wire spacer. The mixture on the plate was degassed to remove trapped air. A thin glass plate was carefully placed over the glass plate and the plates were pressed firmly together, with the degassed mixture sandwiched between. The sandwiched mixture was cured by exposing it to ultraviolet light using a UV lamp (EXFO intensity=16.6 mW/cm$^2$) for 5 minutes. The difference in the refractive index between the sandwiched mixture and the cured film was measured to be 0.024.

Example 4

The mixture of Example 2 was transferred to a glass plate equipped with a wire spacer. The mixture on the plate was degassed to remove trapped air. A thin glass plate was carefully placed over the glass plate and the plates were pressed firmly together, with the degassed mixture sandwiched between. The sandwiched mixture was maintained at about 60° C. for about 40 minutes to form a sandwiched gel. The gel comprised a thiol-cured polyester polymer having pentaerythritol triallyl ether (70% triallyl), trimethylolpropane tris(3-mercaptopropionate) dispersed therein. The sandwiched gel was masked and the central portion of the gel was exposed to ultraviolet radiation (EXFO intensity=16.6 mW/cm$^2$) for about 5 minutes at about 80° C. to polymerize the ene and thiol monomers, thereby forming a mixture of a thiol-ene polymer and a crosslinked polyester in the exposed region. The difference in the refractive index between the masked and unmasked regions was measured to be 0.0181.

Example 5

The mask was removed from the sandwiched gel of Example 4 and the entire sandwiched gel between the two plates was exposed to ultraviolet radiation (EXFO intensity=4.8 mW/cm$^2$) at room temperature for about 2 minutes, thereby partially polymerizing the thiol and ene monomers in the area previously under the mask. The refractive index difference between the previously masked region and the unmasked region was 0.014. This period of exposure was found to provide increased stability of the refractive index difference between the masked and unmasked regions.

Example 6

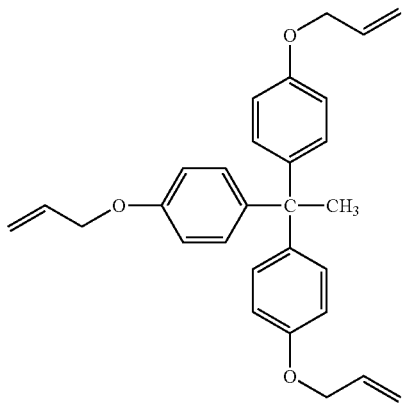

Synthesis of 1,1,1 tris(4-allyloxy-phenyl) ethane: In a 500 mL three neck-round bottom flask equipped with condenser, magnetic stirring bar, dropping funnel, and Argon inlet, 15.00 g (49 mmol) of 1,1,1 tris(4-hydroxy-phenyl) ethane was dissolved in a 1:1 mixture of methylene chloride and tetrahydrofuran. To this mixture, a solution of sodium hydroxide 10.70 g (267 mmol) dissolved in 60 mL of distilled water was added while vigorously stirring. Allyl bromide, 33.36 g (276 mmol) was added followed by 2.5 g (5.96 mmol) tetraphenylphosphoniumbromide catalyst. The reaction mixture was left under positive pressure of Argon while stirring at room temperature. The reaction was monitored by TLC and stopped after 36 hours. The reaction mixture was transferred into separatory funnel and the product was extracted twice with 200 mL of methylene chloride. The organic layers were combined and extensively washed several times with distilled water. The organic extract was dried over anhydrous magnesium sulfate and filtered using Whattman filter paper. To this filtrate, activated charcoal was added and the mixture was stirred for 12 h. The charcoal was filtered and the solvent was evaporated using rotary evaporator. The resulting viscous compound was purified through column chromatography using silica as stationary phase and methylene chloride as an eluent. The solvent was removed using rotary evaporator to yield 14.50 g (70%) of clear, colorless, viscous liquid of 1,1,1 tris (4-allyloxy-phenyl) ethane. $^1$H NMR and IR spectra were consistent with 1,1,1 tris (4-allyloxy-phenyl) ethane. $^1$H NMR (CDCl$_3$): 4.58 (m, CH$_2$O, 6H), 2.17 (s, —CH$_3$), 5.2 (m, =CH$_2$, 6H), 6.1 (m, =CH, 3H), 6.81 (dd, 6 aromatic H ortho to OR), 7.03 (dd, 6 aromatic H meta to OR). IR (NaCl): Major bands at 1293 cm$^{-1}$ (aromatic ether), 2912 cm$^{-1}$ (aliphatic hydrocarbon), and 1648 cm$^{-1}$ (unsaturated hydrocarbon).

Example 7

A kit having Parts I and II was made as follows:
Part 1: In a labeled 100 mL bottle, 10.00 g of poly[(phenyl glycidyl ether)-co-formaldehyde], 10.89 g of trimethylolpropane tris(3-mercaptopropionate), 2.30 g of pentaerythritol triallyl ether, 0.0056 g N-PAL, and 0.0281 g of Irgacure 184™ were weighed. Acetone was added to dissolve the ingredients. Using a stirrer bar and a magnetic stirrer, the ingredients were stirred for about 10 minutes to give a homogenous mixture. The mixture was rotary evaporated at 50° C. for 1-2 hours to evaporate all acetone.

Part II: In another labeled 30 mL amber vial, 2.3689 g of pentaerythritol triallyl ether, 2.5782 g of trimethylolpropane tris(3-mercaptopropionate), and 0.7034 g of polyethyleneimine were weighed. Using a stirrer bar and a magnetic stirrer, the formulation was stirred for about 10 minutes with gentle heating to give a homogenous mixture.

Example 8

A portion of Parts I and II (from the kit of Example 7) were mixed in a ratio of 4.10:1, respectively. The Part I composition was weighed carefully in a 100 mL beaker. Based on the amount of Part I formulation, the calculated amount of Part II was added into the same beaker. The two compositions were first mixed thoroughly by hand using a glass stirrer (glass was found to work better than metal), followed by mixing using a magnetic stirrer to form a mixture having a refractive index of 1.5316, then used immediately as described in Example 9.

Example 9

The mixture of Example 8 was transferred to a glass slide (1 mm thick) equipped with a spacer (20 mil diameter wire around the edges of the slide). The mixture on the slide was degassed to remove trapped air. Another glass slide was carefully placed over the first glass slide, and the plates were pressed firmly together with the degassed mixture sandwiched between. The sandwiched mixture was maintained at about 65° C. for about 5.5 hours to form a sandwiched gel. The gel comprised a crosslinked epoxy polymer having pentaerythritol triallyl ether and trimethylolpropane tris(3-mercaptopropionate) dispersed therein, and having a refractive index of 1.5550.

Example 10

The sandwiched gel made in Example 9 was masked and the central portion of the gel was exposed to ultraviolet radiation (EXFO intensity=100 mW/cm$^2$) for about 10 minutes at about 90° C. to polymerize the ene and thiol monomers, thereby forming a mixture of a thiol-ene polymer and a crosslinked epoxy in the exposed region. The central irradiated region had a refractive index of 1.5668, and the masked outer region had a refractive index of 1.5550 (difference in refractive index between the masked and unmasked regions of 0.0118). The difference between the unmasked region and the mixture made of formulation described in Example 8 was 0.0352.

Example 11

A kit having Parts I and II was made as follows:
Part 1: In a labeled 100 mL bottle, 6.000 g of pentaerythritol triallyl ether (70% triallyl), 13.000 g of trimethylolpropane tris(3-mercaptopropionate), 13.000 g of ATLAC (previously dissolved in acetone, filtered through a 2.5μ filter, and dried), and 0.044 g of Irgacure 184™ were weighed. Using a stirrer bar and a magnetic stirrer, the ingredients was stirred for about 10 minutes to give a homogenous mixture. The mixture was rotary evaporated at 50° C. for 1-2 hours to evaporate all acetone.

Part II: In another labeled 30 mL amber vial, 4.000 g of pentaerythritol triallyl ether (70% triallyl), 8.000 g of trimethylolpropane tris(3-mercaptopropionate), and 0.660 g of amine (1838-L 3M Scotch Weld (Part A)) were weighed. Using a stirrer bar and a magnetic stirrer, the formulation was stirred for about 10 minutes to give a homogenous mixture.

Example 12

A portion of Parts I and II (from the kit of Example 11) were mixed in a ratio of 2.53:1, respectively. The Part I composition was weighed carefully in a 100 mL beaker. Based on the amount of Part I formulation, the calculated amount of Part II was added into the same beaker. The two compositions were first mixed thoroughly by hand using a glass stirrer (glass was found to work better than metal), followed by mixing using a magnetic stirrer to form a mixture, then used immediately as described in Example 13.

Example 13

The mixture of Example 12 was transferred to a glass plate equipped with a wire spacer. The mixture on the plate was degassed to remove trapped air. A thin quartz plate was carefully placed over the glass plate and the plates were pressed firmly together, with the degassed mixture sandwiched between. The sandwiched mixture was cured by exposing it to ultraviolet light using a UV lamp (EXFO intensity=1.5-2.0 $mW/cm^2$) for 30 minutes. The difference in the refractive index between the fully cured and the sandwiched mixture was measured to be 0.025.

Example 14

The mixture of Example 12 was transferred to a glass plate equipped with a wire spacer. The mixture on the plate was degassed to remove trapped air. A thin quartz plate was carefully placed over the glass plate and the plates were pressed firmly together, with the degassed mixture sandwiched between. The sandwiched mixture was maintained at about 60° C. for about 40 minutes to form a sandwiched gel. The gel comprised a crosslinked polyester polymer having pentaerythritol triallyl ether (70% triallyl) and trimethylolpropane tris(3-mercaptopropionate) dispersed therein. The sandwiched gel was masked and the central portion of the gel was exposed to ultraviolet radiation (EXFO intensity=8-10 $mW/cm^2$) for about 5 minutes to polymerize the ene and thiol monomers, thereby forming a mixture of a thiol-ene polymer and a crosslinked polyester in the exposed region. The difference in the refractive index between the masked and unmasked regions was measured to be 0.020.

Example 15

The mask was removed from the sandwiched gel of Example 14 and the entire sandwiched gel between the two plates was exposed to ultraviolet radiation (EXFO intensity=8-10 $mW/cm^2$) for about 2-5 minutes, thereby partially polymerizing the thiol and ene monomers in the area previously under the mask. The refractive index difference between the previously masked region and the unmasked region was 0.007. This period of exposure was found to provide increased stability of the refractive index difference between the masked and unmasked regions.

Example 16

The process described in Examples 12, 14 and 15 is repeated, except that additional amounts of pentaerythritol triallyl ether (70% triallyl) and trimethylolpropane tris(3-mercaptopropionate) are added to the unexposed region of a sandwiched gel prepared as described in Example 14. The resulting sandwiched gel, containing the additional monomers, is then exposed to ultraviolet radiation in the manner described in Example 15, thereby partially polymerizing the thiol and ene monomers in the unmasked area. The refractive index difference between the previously masked region and the unmasked region is greater than 0.007 because of the presence of the additional monomers.

Example 17

A kit having Parts I and II was made as follows:
Part I: In a 500 mL flask, 100 g of poly[(phenylglycidyl ether)-co-formaldehyde], 49.42 g of diallylether Bisphenol A, 0.2761 g of Irgacure 184, and 0.0552 g of N-PAL were dissolved in acetone. The mixture was then filtered through a 0.2 μm syringe filter into another clean 500 mL flask. The filtrate was rotary evaporated at 60° C. for 2 hours to evaporate all acetone.

Part II: In another 500 mL flask, 3.27 g of tetrabutyl ammonium bromide, and 150 g of trimethylolpropane tris (3-mercaptopropionate) were dissolved in acetone. The mixture was then filtered through a 0.2 μm syringe filter into another clean 500 mL flask. The filtrate was rotary evaporated at 50° C. for 2 hours to evaporate all acetone.

Example 18

A portion of Parts I and II: (from the kit of Example 17) were mixed in a ratio of 1.157:1, respectively. The Part I composition was weighed carefully in a 20 mL scintillation vial. Based on the amount of Part I formulation, the calculated amount of Part II was added to the same vial. The two compositions were mixed thoroughly by hand using a glass stirring rod.

Example 19

Approximately 2.6 grams of the mixture of Example 18 was transferred to the concave surface of a Samsung Eye-Tech UV-Clear 1.6 cover 210 (schematically illustrated in FIG. 2) equipped with spacers 220 (pieces of adhesive tape with 20 mil thickness placed around the edges on the concave side of the cover lens). The mixture 230 on the cover 210 was degassed to remove trapped air. A Samsung UV-Clear 1.6 base lens 240 with a 5.0 base curve was carefully placed over the cover lens and the lenses were pressed firmly together, with the degassed mixture 230 sandwiched between to make a lens assembly 250 (schematically illustrated in FIG. 3). The lens assembly 250 was maintained at 75° C. for 5½ hours to cure the sandwiched mixture 230 to a gel. The gel 230 comprised a thiol-cured epoxy having diallylether Bisphenol A and trimethylolpropane tris(3-mercaptopropionate) dispersed therein. After the lens assembly 250 was cooled to room temperature, the base lens 240 was then ground to plano to form an optical element.

Example 20

Figure 4:
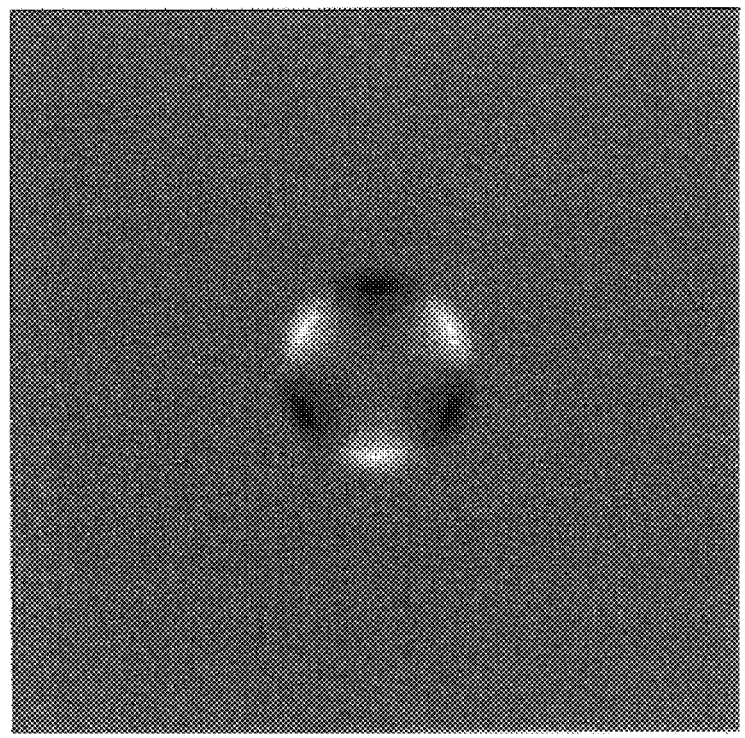
FIG. 4 is a reproduction of a photograph of a photomask suitable for writing a trefoil pattern in an optical element.
Figure 5:
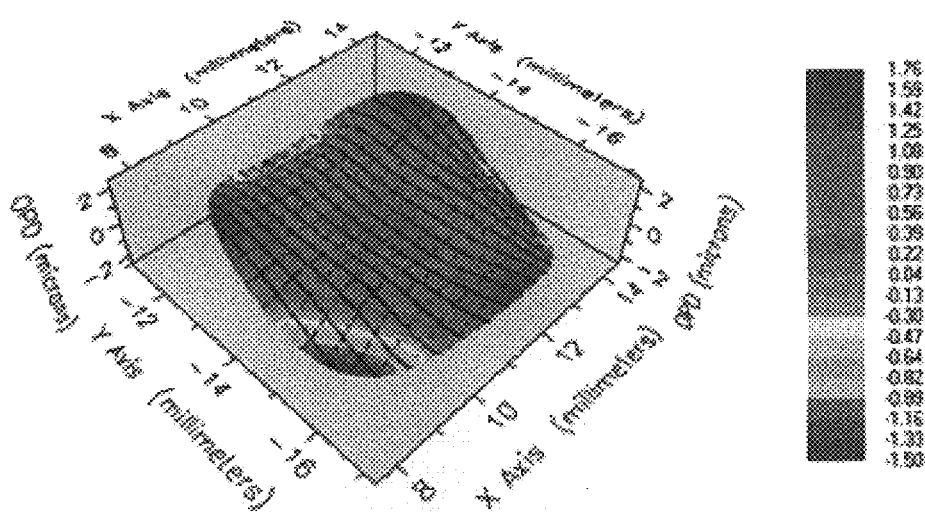
FIG. 5 shows an optical path difference (OPD) map obtained on an optical element.

The lens assembly 250 of Example 19 was placed inside a hot box with a lens holder in order to heat the lens assembly to a temperature of 85° C. A ZYGO interferometer was used to measure the optical path difference (OPD) pattern of the lens assembly prior to UV exposure. This OPD pattern was designated as the reference OPD pattern. A Dymax UV lamp with an integrating rod was used to produce a uniform beam of ultraviolet radiation (Intensity=53 mW/cm$^2$). The central region of the sandwiched gel 230 in the lens assembly 250 was exposed to ultraviolet radiation through a photomask with a trefoil pattern (FIG. 4) for 22 minutes. A ZYGO interferometer was used to measure the OPD pattern created in the sandwiched gel 230 as a result of the ultraviolet exposure through the trefoil photomask. The reference OPD pattern was subtracted from the new OPD pattern, and Intelliwave software was used to create an OPD map (FIG. 5). A peak-to-valley range of 3.27 microns (corresponding to a refractive index difference of 0.01 between the irradiated and masked regions, sufficient to correct higher order aberrations of a large percentage of the population) was obtained over a 6 mm diameter in the central region of the lens.

Example 21

A kit having Parts I and II was made as follows:

Part I: In a 500 mL flask, 100 g of poly[(phenylglycidyl ether)-co-formaldehyde], 33.61 g of diallylether Bisphenol A, 0.2466 g of Irgacure 184, and 0.0740 g of N-PAL were dissolved in acetone. The mixture was then filtered through a 0.2 µm syringe filter into another clean 500 mL flask. The filtrate was rotary evaporated at 60° C. for 2 hours to evaporate all acetone.

Part II: In another 500 mL flask, 3.27 g of tetrabutyl ammonium bromide, and 150 g of trimethylolpropane tris (3-mercaptopropionate) were dissolved in acetone. The mixture was then filtered through a 0.2 µm syringe filter into another clean 500 mL flask. The filtrate was rotary evaporated at 50° C. for 2 hours to evaporate all acetone.

Example 22

Portions of parts I and II (from the kit of Example 21) were mixed in a ratio of 1.16:1, respectively. The Part I composition was weighed carefully in a 20 mL scintillation vial. Based on the amount of Part I formulation, the calculated amount of Part II was added to the same vial. The two compositions were mixed thoroughly by hand using a glass stirring rod. The mixture was degassed to remove trapped air.

Example 23

Approximately 0.3 grams of the mixture of Example 22 was transferred to a 1-inch×1-inch square glass plate equipped with spacers (pieces of adhesive tape with 20 mil thickness placed at the corners of the square). Another 1-inch×1-inch square quartz plate was carefully placed over the first glass plate and the two plates were pressed firmly together, with the degassed mixture sandwiched between to make a test cell. The cell was maintained at 75° C. for 5½ hours to cure the sandwiched mixture to a gel. The gel comprised a thiol-cured epoxy having diallylether Bisphenol A and trimethylolpropane tris(3-mercaptopropionate) dispersed therein.

Example 24

The test cell from Example 23 was placed inside of a hot box with a cell holder in order to heat the cell to a temperature of 85° C. A ZYGO interferometer was used to measure the optical path difference (OPD) pattern of the lens assembly prior to UV exposure. This OPD pattern was designated as the reference OPD pattern. A Dymax UV lamp with an integrating rod was used to produce a uniform beam of ultraviolet radiation (Intensity=53 mW/cm$^2$). The central region of the sandwiched gel in the lens assembly was exposed to ultraviolet radiation through a photomask with a trefoil pattern (FIG. 4) for 3½ minutes. After the irradiation, the test cell was cooled to room temperature. A ZYGO interferometer was used to measure the OPD pattern created in the sandwiched gel as a result of the ultraviolet exposure through the trefoil photomask. The reference OPD pattern was subtracted from the new OPD pattern, and Intelliwave software was used to create an OPD map. A peak-to-valley range of 1.6 microns was obtained over a 6 mm diameter in the central region of the test cell. This was approximately half of the maximum potential peak-to-valley range (2.96 microns as obtained in another test cell) for the test cell.

Example 25

Figure 6:
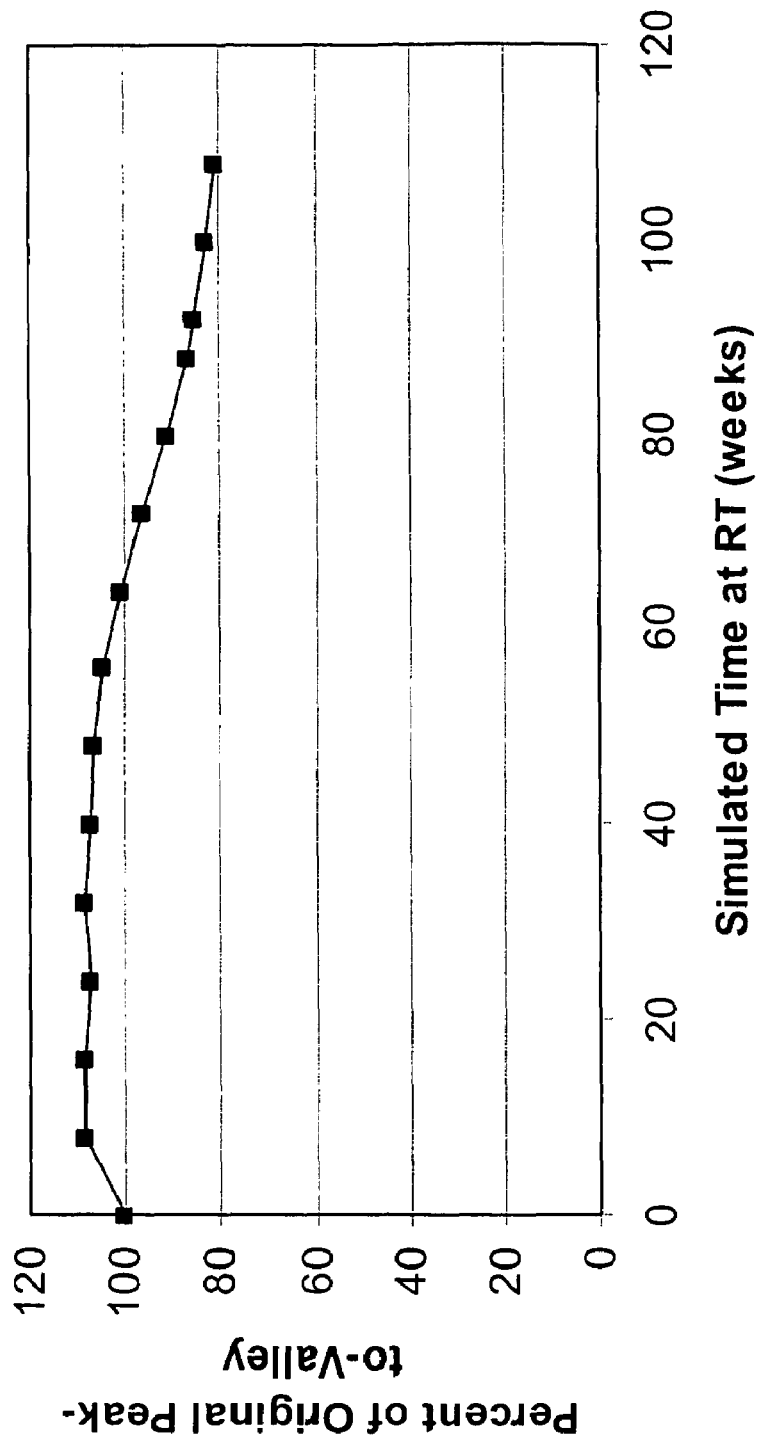
FIG. 6 shows a plot illustrating the change in the OPD pattern as a function of time for a trefoil written into a sandwich polymer gel.

Accelerated thermal aging tests were performed on the test cell irradiated as described in Example 24 in order to evaluate the stability of the trefoil pattern that was written in the sandwiched gel material. An assumption was made that there would be a doubling in degradation rate for every 10° C. increase in temperature (typical assumption for accelerated aging study). Room temperature in the laboratory was measured to be 23° C., and the test cell from Example 24 was kept in an oven at 83° C. (a difference of 60° C.). According to the assumption, degradation would occur 64 (or $2^6$) times faster at 83° C. than at 23° C. (room temperature). Thus, it was calculated that aging the test cell in the oven at 83° C. for 2 hours and 38 minutes would simulate aging it at room temperature for one week (168 hours). The test cell was kept in the oven at 83° C., and pulled out of the oven for brief periods at various times to measure the OPD pattern using the ZYGO interferometer. The test cell was cooled to room temperature prior to every measurement. After each measurement, the new OPD pattern was compared to the original OPD pattern obtained in Example 24 in order to quantify the change of the OPD pattern due to accelerated thermal exposure. FIG. 6 shows a plot of the percent change in peak-to-valley for the trefoil pattern versus simulated time (2 hrs. 38 min. at 83° C.=1 simulated week at 23° C.). The plot shows that the peak-to-valley increased slightly above the original value at first, and then decreased to about 81% of the original value (degradation of only 19%) over a 2-year simulation.

Example 26

Accelerated thermal aging tests were performed on the Part I formulation of the kit of Example 21 in order to evaluate its stability. It was assumed that there would be a doubling in aging rate for every 10° C. increase in temperature (typical assumption for accelerated aging study). The original refractive index of the Part I formulation measured at room temperature was 1.5891. The Part I formulation was kept in an oven at 83° C. for 274 hours to simulate 2 years of aging at room temperature according to the assumption. After two years of simulated aging, the Part I formulation was removed from the oven, and cooled to room temperature. Its refractive index was measured to be 1.5891 (a change of 0% from the original value).

Example 27

The accelerated thermal aging test of Example 26 was performed on the Part II formulation of the kit of Example 21 in order to evaluate its stability. The original refractive index of the Part II formulation was 1.5167. After a 2-year simulation, the refractive index of the Part II formulation had increased to 1.5188 (a change of only 0.14% from the original value).

Example 28

The accelerated thermal aging test of Example 26 was performed on the sandwiched gel of Example 23 to evaluate its stability. The original refractive index of the sandwiched gel was 1.5758. After a 2-year simulation, the refractive index of the sandwiched gel was still 1.5758 (a change of 0% from the original value).

Example 29

Figure 7:
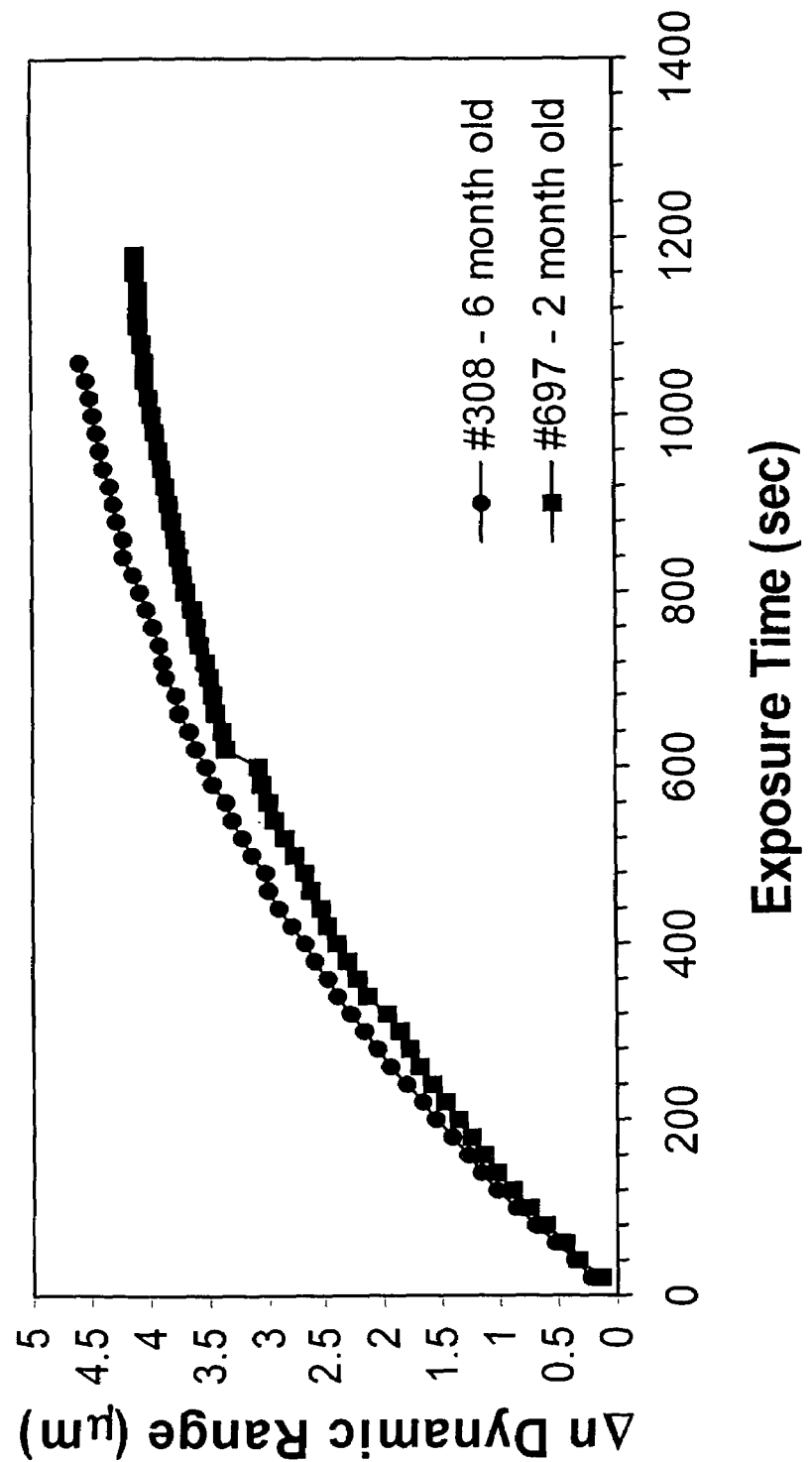
FIG. 7 shows curing curves (dynamic range vs. time) for two lenses prepared as described in Example 29.

The mixture of Example 8 was used to make two lens assemblies prepared as described in Example 19 (except UV-Clear CR-39 was used in place of Samsung EyeTech UV-Clear 1.6 for the cover and base lenses). The two lens assemblies were used in an experiment to evaluate the shelf-life of the sandwiched gel. One lens assembly was stored at room temperature for 2 months and then irradiated using the setup described in Example 20. A peak-to-valley range (or dynamic range) of 4.11 microns was obtained for the trefoil pattern after about 20 minutes of irradiation. The second lens assembly was stored at room temperature for 6 months and then irradiated using the setup described in Example 20. A peak-to-valley range (or dynamic range) of 4.57 microns was obtained for the trefoil pattern after about 18 minutes of irradiation. The curing curves (peak-to-valley vs. time) for the two lenses of this example are shown in FIG. 7. The achievement of approximately similar peak-to-valley range (or dynamic range) and curing curves for each lens demonstrated that the sandwiched gel of this example has a shelf-life of at least 6 months. This has important practical implications as it means that lens assemblies with this sandwiched gel can be manufactured, stored and/or distributed, and then custom-irradiated (with a pattern that corresponds to a patient's unique high order aberration) at a later time without sacrificing the magnitude (peak-to-valley range) of the correction that can be written.

Example 30

A kit having Parts I and II was made by intermixing the following ingredients:

Part I: 23.0 g of reactive Bisphenol A glycerolate (1 glycerol/phenol) diacrylate (BPGDA, $n_D$=1.557) (Aldrich), 46.0 g of ethanol (Aldrich), 0.23 g of photoinitiator (Irgacure 184).

Part II: 25.0 g of reactive 2-hydroxy ethyl methacrylate (HEMA, $n_D$=1.453) (Aldrich), 25.0 g of ethanol, 0.25 g of photoinitiator (Irgacure 184).

Examples 31-36

A series of polymerizable compositions were prepared by intermixing the relative amounts (weight basis) of Parts I and II of the kit of Example 30 as shown in Table 3. Table 3 also shows the refractive indices ($n_D$) of each polymerizable composition and the corresponding refractive indices of the polymers obtained by UV-curing each of the polymerizable compositions.

TABLE 3

| No. | Composition Part II (%) | Part I (%) | $n_D$ (uncured) | $n_D$ (cured) |
|---|---|---|---|---|
| 31 | 0 | 100 | 1.417 | 1.558 |
| 32 | 20 | 80 | 1.413 | 1.535 |
| 33 | 40 | 60 | 1.411 | 1.516 |
| 34 | 60 | 40 | 1.407 | 1.504 |
| 35 | 80 | 20 | 1.405 | 1.483 |
| 36 | 100 | 0 | 1.404 | 1.474 |

Example 37

A kit having Parts I and II was made by intermixing the following ingredients:

Part I: 50.0 g of reactive tri(propylene glycol) diacrylate (TPGDA, $n_D$=1.450) (Aldrich), 50.0 g of ethanol, 0.51 g of photoinitiator, Irgacure 184, and 0.52 g of thermal initiator, azoisobutyronitrile (AIBN) (Aldrich).

Part II: 162.8 g of reactive Bisphenol A glycerolate (1 glycerol/phenol) diacrylate (BPGDA, $n_D$=1.557), 162.8 g of ethanol, 1.63 g of photoinitiator, Irgacure 184, and 1.63 g of thermal initiator, azoisobutyronitrile (AIBN).

Examples 38-43

A series of polymerizable compositions were prepared by intermixing the relative amounts (weight basis) of Parts I and II of the kit of Example 37 as shown in Table 4. Table 4 also shows the refractive indices ($n_D$) of each polymerizable composition and the corresponding refractive indices of the polymers obtained by thermal/UV curing each of the polymerizable compositions.

TABLE 4

| No. | Composition Part I (%) | Part II (%) | $n_D$ (uncured) | $n_D$ (cured) |
|---|---|---|---|---|
| 38 | 0 | 100 | 1.4497 | 1.5595 |
| 39 | 20 | 80 | 1.4365 | 1.5431 |
| 40 | 40 | 60 | 1.4286 | 1.5302 |
| 41 | 60 | 40 | 1.4214 | 1.5203 |
| 42 | 80 | 20 | 1.4120 | 1.4725 |
| 43 | 100 | 0 | 1.4045 | 1.4560 |

Example 44

A kit having Parts I and II was made by intermixing the following ingredients:

Part I: An ene and a thiol of the following structures, 1% Irgacure 184 and 1% Irgracure 819:

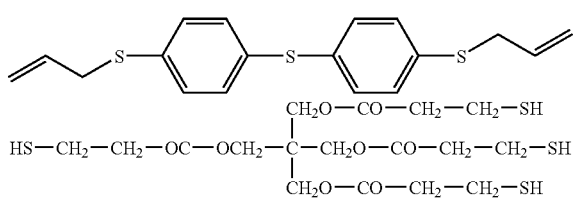

Part II: An ene and a thiol of the following structures, 1% Irgacure 184 and 1% Irgracure 819:

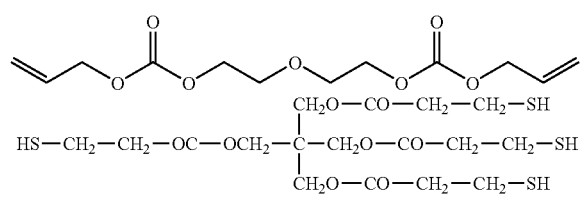

Examples 45-50

A series of polymerizable compositions were prepared by intermixing the relative amounts (weight basis) of Parts I and II of the kit of Example 44 as shown in Table 5. Table 5 also shows the refractive indices ($n_D$) of each polymerizable composition and the corresponding refractive indices of the polymers obtained by UV-curing each of the polymerizable compositions.

TABLE 5

| No. | Composition Part I (%) | Part II (%) | $n_D$ (uncured) | $n_D$ (cured) |
|---|---|---|---|---|
| 45 | 100 | 0 | 1.6150 | 1.6405 |
| 46 | 80 | 20 | 1.5882 | 1.6152 |
| 47 | 60 | 40 | 1.5618 | 1.5889 |
| 48 | 40 | 60 | 1.5370 | 1.5652 |
| 49 | 20 | 80 | 1.5105 | 1.5403 |
| 50 | 0 | 100 | 1.4895 | 1.5205 |

Example 51

A kit having Parts I and II was made by intermixing the following ingredients:

Part I: Styrene, divinylbenzene, thiobisbenzenethiol, 1% Irgacure 184 and 1% Irgacure 819.

Part II: An ene and a thiol of the following structures, 1% Irgacure 184 and 1% Irgacure 819:

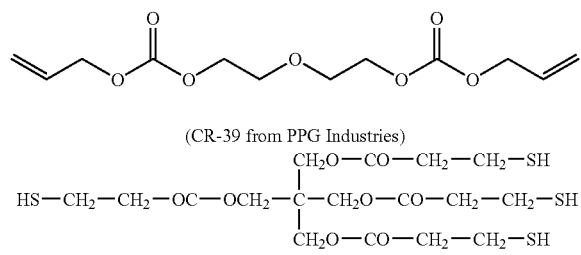

Examples 52-57

A series of polymerizable compositions were prepared by intermixing the relative amounts (weight basis) of Parts I and II of the kit of Example 51 as shown in Table 6. Table 6 also shows the refractive indices ($n_D$) of each polymerizable composition and the refractive index of the one of the polymers obtained by UV-curing a polymerizable composition.

TABLE 6

| No. | Composition Part I (%) | Part II (%) | $n_D$ (uncured) | $n_D$ (cured) |
|---|---|---|---|---|
| 52 | 100 | 0 | 1.6733 | HAZY |
| 53 | 80 | 20 | 1.6396 | HAZY |
| 54 | 60 | 40 | 1.6030 | HAZY |
| 55 | 40 | 60 | 1.5692 | HAZY |
| 56 | 20 | 80 | 1.5332 | HAZY |
| 57 | 0 | 100 | 1.4850 | 1.5125 |

Example 58

A kit having Parts I and II was made by intermixing the following ingredients:

Part I: An ene prepared as in Example 6, a thiol of the following structure, 1% Irgacure 184 and 1% Irgacure 819:

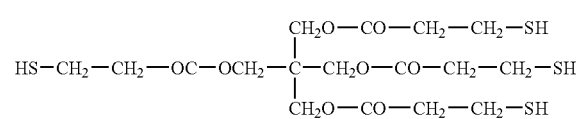

Part II: An ene and a thiol of the following structures, 1% Irgacure 184 and 1% Irgacure 819:

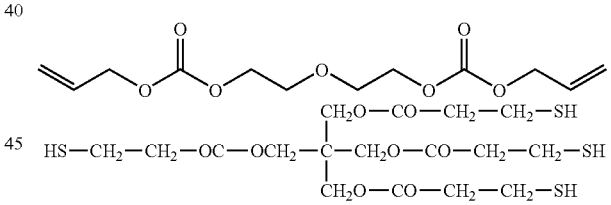

Examples 59-64

A series of polymerizable compositions were prepared by intermixing the relative amounts (weight basis) of Parts I and II of the kit of Example 58 as shown in Table 7. Table 7 also shows the refractive indices ($n_D$) of each polymerizable composition and the corresponding refractive indices of the polymers obtained by UV-curing each of the polymerizable compositions.

TABLE 7

| No. | Composition Part I (%) | Part II (%) | $n_D$ (uncured) | $n_D$ (cured) |
|---|---|---|---|---|
| 59 | 100 | 0 | 1.5608 | 1.5927 |
| 60 | 80 | 20 | 1.5421 | 1.5772 |

TABLE 7-continued

| | Composition | | | |
|---|---|---|---|---|
| No. | Part I (%) | Part II (%) | $n_D$ (uncured) | $n_D$ (cured) |
| 61 | 60 | 40 | 1.5291 | 1.5637 |
| 62 | 40 | 60 | 1.5123 | 1.5474 |
| 63 | 20 | 80 | 1.4980 | 1.5319 |
| 64 | 0 | 100 | 1.4852 | 1.5170 |

Example 65

A kit having Parts I and II was made by intermixing the following ingredients:

Part I: An ene and a thiol of the following structures, 1% Irgacure 184 and 1% Irgacure 819:

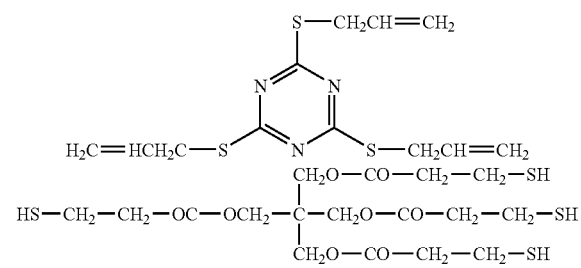

Part II: An ene and a thiol of the following structures, 1% Irgacure 184 and 1% Irgacure 819:

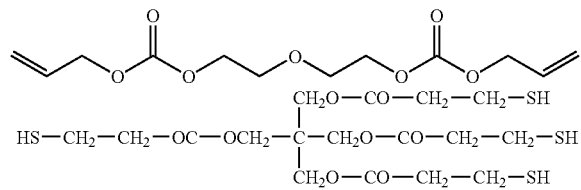

Examples 66-71

A series of polymerizable compositions were prepared by intermixing the relative amounts (weight basis) of Parts I and II of the kit of Example 65 as shown in Table 8. Table 8 also shows the refractive indices ($n_D$) of each polymerizable composition and the corresponding refractive indices of the polymers obtained by UV-curing each of the polymerizable compositions.

TABLE 8

| | Composition | | | |
|---|---|---|---|---|
| No. | Part I (%) | Part II (%) | $n_D$ (uncured) | $n_D$ (cured) |
| 66 | 100 | 0 | 1.5742 | 1.6124 |
| 67 | 80 | 20 | 1.5542 | 1.5962 |
| 68 | 60 | 40 | 1.5371 | 1.5763 |
| 69 | 40 | 60 | 1.5182 | 1.5547 |
| 70 | 20 | 80 | 1.5009 | 1.5341 |
| 71 | 0 | 100 | 1.4852 | 1.5170 |

Example 72

A kit having Parts I and II was made by intermixing the following ingredients:

Part I: An ene as prepared in Example 6, an ene and a thiol of the following structures, and 1% Irgacure 184:

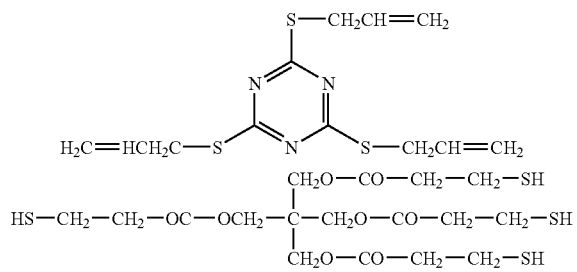

Part II: An ene and a thiol of the following structures, 1% Irgacure 184 and 1% Irgacure 819:

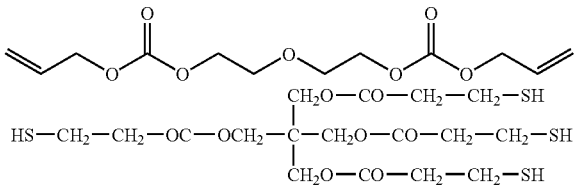

Examples 73-78

A series of polymerizable compositions were prepared by intermixing the relative amounts (weight basis) of Parts I and II of the kit of Example 72 as shown in Table 9. Table 9 also shows the refractive indices ($n_D$) of each polymerizable composition and the corresponding refractive indices of the polymers obtained by UV-curing each of the polymerizable compositions.

TABLE 9

| | Composition | | | |
|---|---|---|---|---|
| No. | Part II (%) | Part I (%) | $n_D$ (uncured) | $n_D$ (cured) |
| 73 | 100 | 0 | 1.4802 | 1.5121 |
| 74 | 80 | 20 | 1.4990 | 1.5300 |
| 75 | 60 | 40 | 1.5120 | 1.5423 |
| 76 | 40 | 60 | 1.5306 | 1.5654 |
| 77 | 20 | 80 | 1.5502 | 1.5847 |
| 78 | 0 | 100 | 1.5674 | 1.5905 |

Example 79

A kit having Parts I and II was made by intermixing the following ingredients:

Part I: An ene as prepared in Example 6 (18 g), a thiol of the following structure (10.98 g), Brij 52 (Aldrich) (surfactant, 0.02 g), Brij 58 (Aldrich) (surfactant, 0.02 g), Irgacure 184 (0.161 g) and Irgacure 819 (0.119 g):

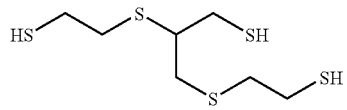

Part II: An ene (50 g) and a thiol (32.66 g) of the following structures, Irgacure 184 (0.27 g):

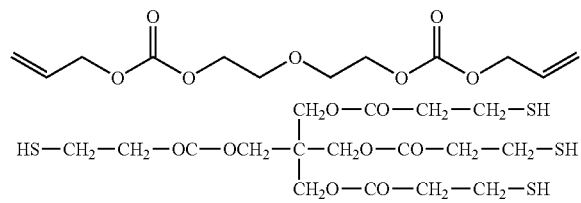

Examples 80-85

A series of polymerizable compositions were prepared by intermixing the relative amounts (weight basis) of Parts I and II of the kit of Example 79 as shown in Table 10. Table 10 also shows the refractive indices ($n_D$) of each polymerizable composition and the corresponding refractive indices of the polymers obtained by UV-curing each of the polymerizable compositions.

TABLE 10

| No. | Composition | | $n_D$ (uncured) | $n_D$ (cured) |
| | Part II (%) | Part I (%) | | |
|---|---|---|---|---|
| 80 | 100 | 0 | 1.4820 | 1.5104 |
| 81 | 80 | 20 | 1.5094 | 1.5380 |
| 82 | 60 | 40 | 1.5327 | 1.5648 |
| 83 | 40 | 60 | 1.5571 | 1.5906 |
| 84 | 20 | 80 | 1.5786 | 1.6150 |
| 85 | 0 | 100 | 1.6004 | 1.6405 |

It will be appreciated by those skilled in the art that various omissions, additions and modifications may be made to the processes described above without departing from the scope of the invention, and all such modifications and changes are intended to fall within the scope of the invention, as defined by the appended claims.

What is claimed is:
1. An optical element, comprising:
   a first lens;
   a cover; and
   a matrix polymer sandwiched between the first lens and the cover;
   the matrix polymer having a monomer mixture dispersed therein;
   the matrix polymer being selected from the group consisting of polyester, polystyrene, polyacrylate, thiol-cured epoxy polymer, thiol-cured isocyanate polymer, and mixtures thereof; and
   the monomer mixture comprising a thiol monomer and at least one second monomer selected from the group consisting of ene monomer and yne monomer.
2. The optical element of claim 1 in which the cover is a second lens.
3. The optical element of claim 2 in which the first lens is a lens blank.
4. The optical element of claim 1 in which the matrix polymer comprises an amount of a polymerization inhibitor that is effective to at least partially inhibit polymerization of the monomer mixture.
5. An optical element, comprising:
   a first lens;
   a cover; and
   a polymer mixture sandwiched between the first lens and the cover, the polymer mixture comprising a first polymer and a second polymer;
   the first polymer being selected from the group consisting of polyester, polystyrene, polyacrylate, thiol-cured epoxy polymer, thiol-cured isocyanate polymer, and mixtures thereof;
   the second polymer being selected from the group consisting of thiol-ene polymer and thiol-yne polymer;
   the polymer mixture comprising at least one region in which the first polymer has a first refractive index and the second polymer has a second refractive index that is different from the first refractive index.
6. The optical element of claim 5 in which the cover is a second lens.
7. The optical element of claim 5 in which the cover is a coating.
8. The optical element of claim 6 in which the first lens is a lens blank.
9. The optical element of claim 5 in which the polymer mixture comprises at least one additional region in which the second polymer has a refractive index that is different from the second refractive index.
10. The optical element of claim 5 in which the polymer mixture comprises at least two regions in which the refractive indices are different from each other.

* * * * *